United States Patent
MeLampy et al.

(10) Patent No.: US 6,697,475 B1
(45) Date of Patent: Feb. 24, 2004

(54) SYSTEM AND METHOD FOR IMPLEMENTING AN END OFFICE SWITCH WITH ENHANCED FUNCTIONALITY USING AN OPERATING SYSTEM INDEPENDENT DISTRIBUTED SELF-CONTAINED DYNAMIC LOGIC SYSTEM

(75) Inventors: Patrick J. MeLampy, Pepperell, MA (US); Todd Sherer, North Andover, MA (US); Biao Ren, Acton, MA (US); Robert Penfield, Concord, MA (US)

(73) Assignee: LHS Group, Inc., Atlanta, GA (US)

( * ) Notice: Subject to any disclaimer, the term of this patent is extended or adjusted under 35 U.S.C. 154(b) by 0 days.

(21) Appl. No.: 09/557,475

(22) Filed: Apr. 24, 2000

Related U.S. Application Data

(60) Provisional application No. 60/161,388, filed on Oct. 26, 1999.

(51) Int. Cl.[7] .......................... H04M 3/42; H04M 7/00; H04J 3/12; H04L 12/16; H04L 12/66
(52) U.S. Cl. .................. 379/201.12; 370/259; 370/352; 370/384; 370/522; 379/221.09; 379/229; 379/230; 379/900
(58) Field of Search ................................ 370/259, 352, 370/384, 385, 401, 495, 522; 379/201.01, 201.12, 207.02, 219, 221.08, 221.09, 229, 230, 333, 900

(56) References Cited

U.S. PATENT DOCUMENTS

| | | | |
|---|---|---|---|
| 4,942,598 A | 7/1990 | Davis ............... | 379/207.15 X |
| 5,574,783 A | * 11/1996 | Dunn .......................... | 379/230 |
| 5,764,747 A | 6/1998 | Yue et al. .............. | 379/211.03 |

(List continued on next page.)

FOREIGN PATENT DOCUMENTS

| WO | WO 91/07838 | 5/1991 | .......... H04M/11/00 |
|---|---|---|---|

(List continued on next page.)

OTHER PUBLICATIONS

G.D. Turner, "Service Creation", pp. 80–86, BT Technology Journal, vol. 13, No. 2, Apr. 1, 1995.
Steven D. Silberstang, "Service Creation for Advanced Intelligent Networks Utilizing Intelligent Peripherals", pp. 911–918, Annual Review of Communications, National Engineering Consortium, vol. 49, Jan. 1, 1996.

*Primary Examiner*—Harry S. Hong
(74) *Attorney, Agent, or Firm*—Dority & Manning; Leonard W. Pojunas, Jr., Esq.

(57) ABSTRACT

An operating system independent distributed self-contained dynamic logic system is disclosed. The dynamic logic system enables EO functionality in small edge routers or programmable switches which serve a small population of users instead of the rather large population typically served by a 5ESS or DSM100 central office switch. A disclosed method provides the capability for EO switch enhanced functionality that is programmable from a remote location The dynamic logic system may be implemented across several elements, including a subscriber database called a Service Control Point (SCP), a computer called a Service Management Point (SMP) for controlling and distributing programmable logic to implement EO features, and an Edge Switching Point (ESP) for interacting with a physical device (telephone/data endpoint). The dynamic logic system may be introduced at the "intercept" layer between the physical edge switching point device, typically a telephone interface, and a routing network. The routing network may be a packet switched network, a traditional Class-4 network. or an equivalent. This intercept receives inputs from both the device, and the routing network. The processing of these events, to create an application, is controlled by distributed logic. The distributed logic is managed by the SMP. The logic is activated by an operator, and is distributed for consumption. The logic is completely self-contained, requiring only subscriber data to execute, which is obtained on a call-by-call basis. In addition to having all the capabilities of traditional EO switching functions, like playing tones, gathering digits, and routing calls, other functionality may be easily added to enhance and add new dimensions to EO switching.

38 Claims, 27 Drawing Sheets

U.S. PATENT DOCUMENTS

| | | | | |
|---|---|---|---|---|
| 5,878,128 A | * | 3/1999 | Kantola | 379/230 |
| 6,084,956 A | * | 7/2000 | Turner et al. | 379/230 |
| 6,125,177 A | * | 9/2000 | Whittaker | 379/243 |
| 6,266,289 B1 | * | 7/2001 | Dubovik et al. | 365/213 |
| 6,381,321 B1 | * | 4/2002 | Brown et al. | 379/207.02 |
| 6,483,912 B1 | * | 11/2002 | Kalmanek et al. | 379/219 |
| 6,529,596 B1 | * | 3/2003 | Asprey et al. | 379/224 |

FOREIGN PATENT DOCUMENTS

| | | | |
|---|---|---|---|
| WO | WO9731473 | | 8/1997 |
| WO | WO9921345 | | 4/1999 |

* cited by examiner

SYSTEM AND METHOD FOR IMPLEMENTING AN END OFFICE SWITCH WITH ENHANCED FUNCTIONALITY USING AN OPERATING SYSTEM INDEPENDENT DISTRIBUTED SELF-CONTAINED DYNAMIC LOGIC SYSTEM

CROSS-REFERENCE TO RELATED APPLICATION

The present application claims the benefit of U.S. Provisional Patent Application, assigned serial No. 60/161,388, filed Oct. 26, 1999, which is hereby incorporated by reference in its entirety.

TECHNICAL FIELD

The present invention generally relates to telephone network functionality, and more particularly, to a system and method for implementing class 5 end office switch functionality with extensions to interface with enhanced services such as voice response circuits, subscriber databases, and carrier databases. The system and method of the present invention are particularly suited for implementation between the physical circuit capabilities (signaling, Dual Tone Multi-Frequency (DTMF), call progress tone generation, and detection) and the transit networks within a telephone network.

BACKGROUND OF THE INVENTION

High capacity end office switches, such as the Lucent 5ESS or the Nortel DMS-100/250, have very complex call models which are implemented in software consisting of millions of lines of code. These switching interfaces are designed to comply with standards set by Telcordia Technologies and the International Telecommunication Union (ITU). Telcordia Technologies (formerly Bellcore i.e., Bell Communications Research) is an industry consortium responsible for specifying telecommunications technology generic requirements for North America. The ITU (formerly CCITT i.e. Consultative Committee on International Telegraphy and Telephony) is a United Nations Agency within which governments and the private sector coordinate global telecom networks and services standards recommendations. Compliance with these standards guarantees that most of the standard telephone features will interoperate correctly in mixed manufacturer networks. The sheer size of the complex high-availability software applications that must conform to industry standards requirements makes adding new feature functionality difficult in these products.

Many of the standard Intelligent Network (IN) features (e.g., Automatic Recall (*69), Automatic Callback (*66 i.e., Bellcore TR-NWT-000227), (*66 i.e., Bellcore TR-NWT-0002215), Conditional Call Forwarding (*40, *42, *72 i.e., Bellcore TR-TSY-000580 and TR-TSY-000586); etc.) use digit sequences which are sometimes difficult to remember and have limited feedback mechanisms to indicate an error condition or guide inexperienced users. Because of this poor, yet simple human interface, some of the sophisticated features are not fully utilized. For example, features that require the user to program conditionals and number lists such as conditional call forwarding, speed dial, and selective call rejection are seldom used to their full potential. The introduction of new readily available technologies such as text to speech, voice processing, voice recognition, and the worldwide-web would be difficult to integrate without standards for interoperability.

Adding new features requires extensive development and testing initiatives due to the complexities of individual features and the large number of feature interactions that occur between different features. In addition, interacting with callers using voice recognition, or voice response circuits is not possible unless adjunct processing is utilized, since the vast install base of end office switches were not designed to perform these tasks.

Changes in dialing related features, such as equal access carrier selection, often requires software development and modifications by the switch manufacturer (e.g. Lucent, Nortel, etc.). In order to have true intelligence, many of the features require "network support." "Network support," generally implies that messaging between end office switches is required to properly implement the feature. "Network support" requires agreed upon interoperability standards to make features work. This often delays new feature introduction at central office locations that contain a mix of vendor products.

IN solutions based on "event triggers" managed by service control point (SCP) network elements, require standards based network deployments. These solutions provide distributed features controlled from centrally located SMPs. A SCP is often implemented by a subscribing customer database. To date, very simple applications and call flows have been developed based on the IN architecture.

Due to deregulation, wide spread availability, and improvements in technology, many non-traditional solutions are being considered for local telephone use, including cable telephone, and wireless services. It is highly desirable for each non-traditional implementation of local telephone service to include all standard phone system functionality, as well as, enhanced services such as voice recognition, voice processing, and text to speech translation.

In an attempt to satisfy modern customer demands and requirements, administrators of today's switching systems have attempted to integrate different types of computer hardware and operating systems into the central offices. Until now, this mixed environment of computer hardware and operating systems has prevented the distribution of new software applications, which would provide new enhanced features to customers and take full advantage of existing equipment capabilities.

SUMMARY OF THE INVENTION

In order to overcome some of the shortcomings of the traditional standards based network, and to achieve the objects and advantages of the present invention, the invention utilizes a programmable network Edge Switching Point (ESP), a Service Control Point (SCP), and a Service Management Point (SMP). The invention is a system and method for delivering class 5 office functionality with enhanced services such as embedded voice response and voice recognition utilizing a distributed self-contained logic system inserted between the physical circuit capabilities (signaling, tone generation, tone detection), and the transit networks. New sophisticated subscriber features can be activated simply by distributing call-processing logic to edge switching points. Although similar in capabilities to the IN architecture, this logic system is completely self-contained and does not require "network support." The logic is managed by an SMP. The SMP distributes and manages different versions of the logic as desired by the administrator of the system. The inputs to the logic system are signaling events and subscriber data. The outputs are call establishment requests, tone generation primitives, and tone detection primitives. The signaling inputs include traditional analog loopstart signals such as off-hook, flash-hook, on-hook, as well as GR-303 messages like SETUP, CALL PROCEEDING, ALERTING, CONNECT, CONNECT ACKNOWLEDGE, DISCONNECT, RELEASE, and RELEASE COMPLETE. Call establishment requests include all of the necessary signaling data to establish a network call using any of the following ISUP call setup message parameter elements: Automatic Number Identification (ANI), Dialed Number Identification Service (DNIS), Redirect, Presentation Indicator, Progress Indicator, Automatic Number Identification Information Integers (ANI-II i.e., type of station), and Carrier Identification Code (CIC).

The logic system was developed using a machine independent software language capable of being installed or updated from a central location. In addition, the language must be of the type that can be parsed and compiled to make subsequent execution efficient, as call processing is a real time application. Software programming and scripting languages that meet these requirements include Java, Java Script, Practical Extraction and Reporting Language, otherwise known as Pathologically Eclectic Rubbish Lister or PERL, and Python. All of these languages have mathematical and string processing capabilities as well as structured programming controls. Each of the above languages is either compiled or interpreted into universal operation code that is operating system and machine independent. Should the logic require dynamic modification, and/or request that a remote feature execute locally, the new logic can be retrieved, parsed, and executed as required. The logic can be distributed via Transmission Control Protocol/Internet Protocol (TCP/IP) as either an American Standard Code for Information Interchange (ASCII) text script file or machine independent compiled applets from a SMP to various SCPs and ESPs. It is important to note that the distributed logic of the present invention is not limited to the software languages previously recited.

It is an objective of this invention to implement a class 5 switch by receiving and processing edge switch events and sending switching primitive commands in order to setup and tear down calls on a routing network. The logic system which embodies the class 5 switch may be dynamically loaded, and may include innovative extensions to interface and operate with voice response circuits, SCPs, and traditional database architectures. These extensions provide new features and enhanced user interfaces for existing features.

New sophisticated features will be available by distributing the logic to switching end-points. The solution also scales because the high number of trigger interaction points are managed by the distributed logic, instead of round trip communications to a SCP, as defined in the IN architecture.

The system and method of the present invention allows for many different types or instances of complete call processing logic simultaneously, allowing different behavior for different user groups and individual users. The logic was further designed so that it may invoke another instance of the logic to permit feature behavior changes in real time for individual users as required.

Another advantage inherent in the present invention is the ability to deploy new or changed features easily and rapidly. The system and method of the present invention provides centralized distribution of logic to process events with real time updating at multiple remote locations. The system further provides a generalized database access mechanism with large scalability, as well as, a logic system which uses high level programming concepts, such as, control structures, scalar arithmetic, operators, regular expression string manipulation and pattern matching, and structured object-oriented constructs.

Another advantage of the present invention is that the system provides an "intercept" trigger and line interaction layer between network interfaces and class 4 switching software. The system further provides a user modifiable state table for feature development.

Another significant advantage of the present invention is that it provides a complete set of user interface controls for use at the intercept logic system layer, including Dual Tone Multi-Frequency (DTMF) detection, Frequency Shift Keying (FSK) data bursts (from other FSK generating equipment and to the telephone subscriber's equipment e.g., caller ID display unit), tone generation, voice prompting, voice recording, and speech recognition.

BRIEF DESCRIPTION OF THE DRAWINGS

The invention can be better understood with reference to the following drawings. The components in the drawings are not necessarily to scale, emphasis instead being placed upon clearly illustrating the concepts of the present invention. Where diagrams could not be captured on a single page, circles identified with a reference numeral, describe connectivity from FIG. to FIG..

FIG. 5 is a flowchart illustrating a station outbound call, a first branch after a station validity check, and a branch on event.

FIG. 6 is a flowchart illustrating outbound call processing upon a failure event.

FIG. 7 is a flowchart illustrating outbound call processing upon a station off-hook event.

FIG. 8 is a flowchart illustrating outbound call processing upon a single digit report or a timeout.

FIG. 9 is a flowchart illustrating outbound call processing upon a multiple digit report or timeout.

FIG. 10 is a flowchart illustrating outbound call processing upon an answer event.

FIG. 11 is a flowchart illustrating outbound call processing upon an attention event.

FIG. 12 is a flowchart illustrating outbound call processing upon a station on-hook event.

FIG. 13 is a flowchart illustrating outbound call processing upon a guarded release event.

FIG. 14 is a flowchart illustrating outbound call processing upon an out-of-service/in-service (OOS/IS) event.

FIG. 15 is a flowchart illustrating outbound call processing upon a name resolve event.

FIG. 16 is a flowchart illustrating outbound call processing upon an operator event.

FIG. 17 is a flowchart illustrating outbound call processing upon a get long distance number event.

FIG. 18 is a flowchart illustrating outbound call processing upon an international number event.

FIG. 19 is a flowchart illustrating outbound call processing upon a get carrier event.

FIG. 20 is a flowchart illustrating outbound call processing upon a get local number event.

FIG. 21 is a flowchart illustrating outbound call processing upon an N11 feature event.

FIG. 22 is a flowchart illustrating outbound call processing upon a supplementary feature event.

FIG. 23 is a flowchart illustrating outbound call processing upon a speed dial event.

FIG. 24 is a flowchart illustrating outbound call processing upon a route call event.

FIG. 25 is a flowchart illustrating outbound call processing upon a disable call-waiting event.

FIG. 26 is a flowchart illustrating outbound call processing upon a malicious trace event.

FIG. 27 is a flowchart illustrating outbound call processing upon a dial by name event.

FIG. 28 is a flowchart illustrating the start of an inbound call, a first branch after a station validity check, and a branch on event.

FIG. 29 is a flowchart illustrating inbound call processing upon an OOS/IS event.

FIG. 30 is a flowchart illustrating inbound call processing upon a seize event.

TABLES

Figure 1:
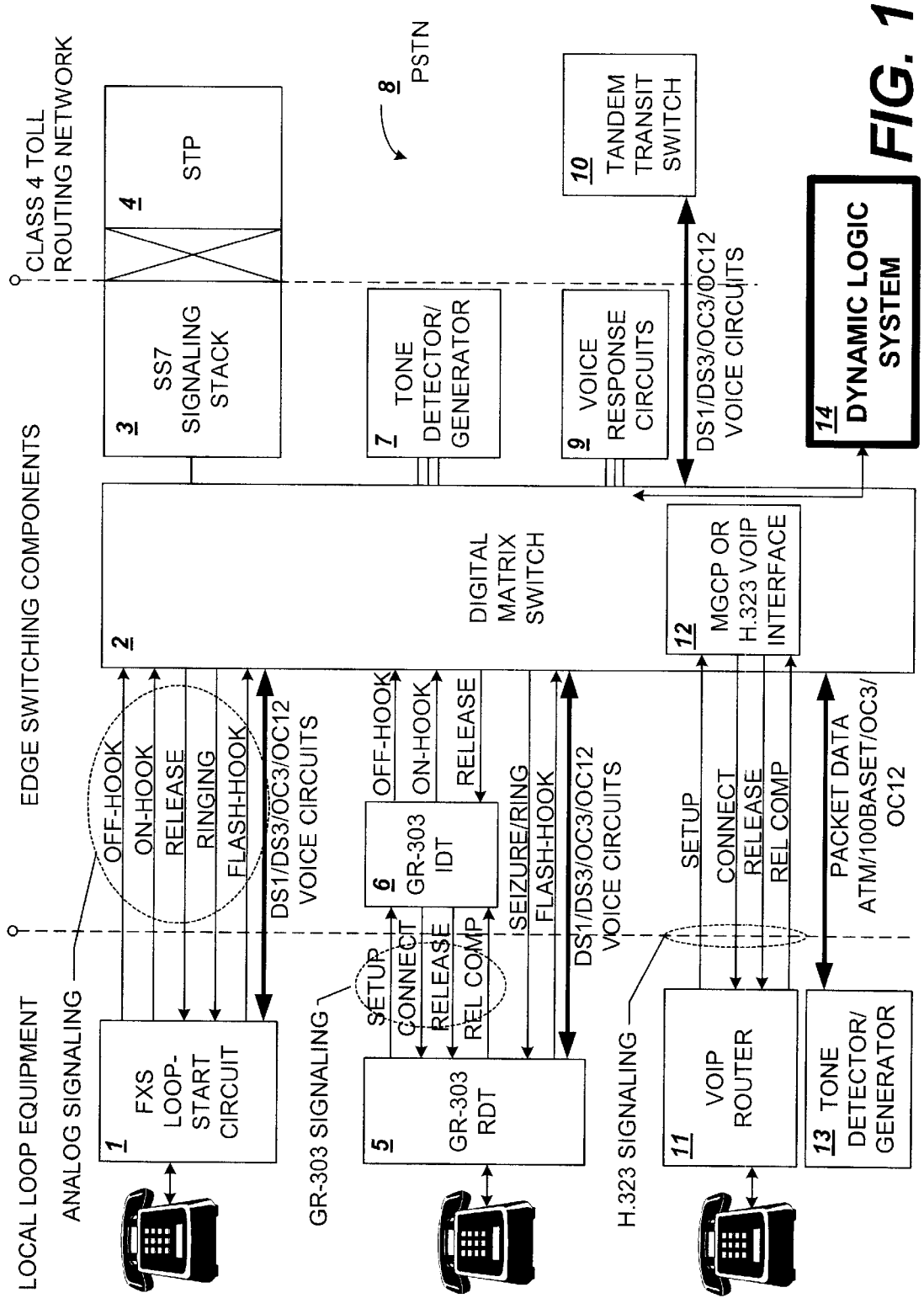
FIG. 1 is a block diagram illustrating the location of the Dynamic Logic System (DLS) of the present invention within a modem end office (EO) in the Public Switched Telephone Network (PSTN) and the telephone station states, events, and digital protocol messages used to interact with the DLS.

| Table 1 | Acronyms and Definitions | 10–11 |
| Table 2 | Telecommunication Standards | 11–12 |
| Table 3 | Station Based Data | 21 |
| Table 4 | Station Outbound Restrictions | 22 |
| Table 5 | Station Inbound Restrictions | 22 |
| Table 6 | Station Based Speed Dial Entries | 22 |
| Table 7 | Station Account Code | 23–26 |
| Table 8 | ESP "Ping" Message | 47 |
| Table 9 | SMP "Ping" Response | 47 |

TABLE OF CONTENTS

| I. | System Hardware | | 12 |
|---|---|---|---|
| II. | System Logic | | 16 |
| | A. Logic Inputs | | 18 |
| | | 1. Data | 19 |
| | | a. Station Data | 19 |
| | | 2. Events | 26 |
| | | a. Edge Switch Point Events | 27 |
| | | b. Transit Network Events | 28 |
| | | c. Time-Out Queue Events | 29 |
| | B. Logic Outputs-Primitives | | 29 |
| | | 1. Edge Switch Point Primitives | 29 |
| | | 2. Transit Network Primitives | 30 |
| | | 3. Database Primitives | 32 |
| | | 4. Enhanced Service Primitives | 35 |
| | | 5. Time-Out Queue Primitives | 36 |
| | C. Features | | 36 |
| | | 1. Three Digit Numbers-N11 | 36 |
| | | 2. Standard Calling | 40 |
| | | 3. Three Digit Features-*AX | 45 |
| | | 4. Optional Seven-Digit Equal Access Carrier | 45 |
| | | 5. Valid PSTN Address | 45 |
| III. | Distribution and Activation of System Logic | | 46 |
| IV. | Call Processing Flow | | 48 |
| | A. Outbound Calls | | 50 |
| | B. Inbound Calls | | 60 |
| V. | Anticipated Variations and Modifications | | 63 |

TABLE 1

ACRONYMS AND DEFINITIONS

| | |
|---|---|
| AIN | Advanced Intelligent Network. |
| ATM | Asynchronous Transfer Mode. A cell relay transmission scheme used for Broadband Integrated Services Digital Network (B-ISDN) applications. |
| CCS | Common Channel Signaling. |
| CRV | Call Reference Value is a network end-point address. |
| DLS | Dynamic Logic System is the machine independent logic and software application described in this specification. |
| EO | End Office. Often referred to as a class 5 switch or central office. The EO is the interface device located at the service providers premises that allows a subscriber to access the PSTN. |
| ESP | Edge Switching Point is a programmable switch used to convert the call processing events from the end-user into a format suitable for other network components such as the transit network. |
| ES | Enhanced Services provide primarily voice processing capabilities such as voice recording and playback, text to speech, and speech recognition. |
| EVENT | A change in signaling (seize, off-hook, on-hook, flash) or a user generated datum (touch-tone). Events are reported when detected. |
| GR-303 | Criteria for Next Generation Integrated Digital Loop Carrier (NG-IDLC) systems for concentration and digital transport to and from a RDT located near a subscriber and an IDT located at a Local Digital Switch (LDS) which provides a full range of narrowband and wideband telecommunications services. |
| H.323 | A ITU recommendation which describes systems that provide multimedia communications services over Packet Based Networks (PBN). |
| IDT | Integrated Digital Terminal (IDT)-is the logical resource of an Local Digital Switch (LDS) that is associated with a single RDT. |
| IN | Intelligent Network |
| MGCP | Media Gateway Control Protocol is an interface protocol used for controlling VoIP Gateways from external call control elements. |
| PSTN | Public Switched Telephone Network |
| RDT | Remote Digital Terminal (RDT)-is a GR-303 intelligent network element that provides an interface between the customer lines and the DS1 facilities. The RDT is physically remote from the central office and provides a concentration and digital multiplexing function which reduces costs and improves network reliability. |
| SCP | Service Control Point. A transaction processor-based system designed to provide various network and subscriber database services. |
| SMP | Service Management Point. A device that centralizes all functions needed to manage the network and IN services, as well as to customize services, configurations, alarms, generate statistics, and establish access rights. |
| SS7 | Signaling System Number 7 |
| STP | Signaling Transfer Point. A signaling point with the function of transferring signaling messages from one signaling link to another. |
| TOQ | Time-Out Queue |
| TN | Transit Network is the part of the PSTN that routes a call from the originating EO to the destination EO. |

REFERENCES

TEXTS

[1] Advanced PERL Programming by Sriram Srinivansan published by O'Reilly & Associates, Inc.
[2] Programming PERL by Wall, Christiansen and Schwartz by O'Reilly & Associates, Inc.

TABLE 2

TELECOMMUNICATION STANDARDS

| | |
|---|---|
| TR-TSY-000532 | Call processing features, FSDs 30-16-0000 through 30-23-0000 July 1987 |
| GR-505 | LSSGR: Call Processing, December 1997 |
| TR-NWT-000215 | Class feature: automatic callback, FSD 01-02-1250 June 1993 |
| GR-2948 | Prompted automatic call back December 1996 |
| TR-NWT-00227 | Class(SM) feature: automatic recall, FSD 01-02-1260 July 1993 |
| TR-TSY-000218 | Class feature: selective call rejection, FSD 01-02-0760 November 1988 |
| TR-NWT-000567 | Class feature: anonymous call rejection, FSD 01-02-1060 December 1991 |
| TA-TSY-001034 | Class(TM) feature: selective call acceptance April 1990 |
| TR-NWT-000220 | Class(SM) feature screening list editing, FSD 30-28-0000 December 1993 |
| TR-TSY-000586 | Call forwarding sub-features, FSD 01-02-1450 July 1989 |
| TR-NWT-000972 | Call forwarding sub-features: switching system requirements Using signaling system no. 7 (SS7) September 1990 |
| TR-TSY-000580 | LATA switching systems generic requirements (LSSGR): call Forwarding variable, FSD 01-02-1401 October 1989 |
| TR-TSY-000217 | Class feature: selective call forwarding, FSD 01-02-1410 November 1988 |
| GR-1512 | Call screening October 1994 |
| GR-2913 | Generic requirements for call park FSD 01-02-2400 February 1996 |
| TR-TSY-000579 | Add-on transfer and conference calling features, FSD 01-02-1305 September 1989 |
| TR-TSY-000571 | Call waiting, FSD 01-02-1201 October 1989 |
| GR-416 | Class feature: call-waiting deluxe FSD 01-02-1215 April 1995 |
| TR-TSY-000572 | Cancel call-waiting, FSD 01-02-1204 July 1989 |
| TR-NWT-000031 | Class(TM) feature: calling number delivery, FSD-01-02-1051 December 1992 |
| TR-NWT-000575 | Class feature: calling identity delivery on call-waiting, FSD 01-02-1090 October 1992 |
| TR-TSY-000216 | Class feature: customer originated trace, FSD 01-02-1052 May 1988 |
| TR-TSY-000219 | Class feature: distinctive ringing/call-waiting, FSD 01-01-1110 November 1988 |
| GR-1520 | Ring Control October 1994 |
| GR-1517 | Class(SM) feature: outside calling area alerting January 1996 |
| TR-TSY-000570 | Speed calling, FSD 01-02-1101 July 1989 |
| GR-3006 | Class feature: voice identity for non subscribers December 1998 |
| GR-2859 | Switched based feature interaction December 1995 |
| TR-TSY-000520 | Features common to residence and business customers FSDs 00 to 01-01-1000 July 1987 |
| SR-504 | SPCS capabilities and features March 1996 |
| GR-800 | Network systems generic requirements (NSGR) directory September 1994 |
| SR-3065 | 1998 LSSGR guide June 1998 |

DETAILED DESCRIPTION OF THE PREFERRED EMBODIMENTS

I. SYSTEM HARDWARE

To illustrate the environment of the system and method of the present invention, reference is made to FIG. 1. FIG. 1 is a block diagram illustrating three possible configurations that might be used in the End Office (EO) portion of a Public Switched Telephone Network (PSTN) 8. The PSTN 8 may include local loop equipment, edge switching components, and a class 4 toll routing network.

Telephone equipment may be integrated with EO switching components via a FXS loop-start circuit 1, a GR-303 Remote Digital Terminal (RDT) 5, or a Voice Over Internet Protocol (VoIP) router 11. It is important to note that for the three different configurations shown in FIG. 1, the voice circuit or data link may be implemented on any of the common Digital Signal Hierarchy (DSH) (e.g., DS1/T1, DS3/T3 etc.) or SONET/Synchronous Digital Hierarchy (SDH) (e.g. OC1, OC3/STM-1 etc.) signals.

Signaling between the FXS loop-start circuit 1 and a digital matrix switch 2 may be implemented using off-hook, on-hook, and flash-hook signals from the FXS loop-start circuit 1 to the digital matrix switch 2. Similarly, release and ringing signals may be integrated from the digital matrix switch 2 to the FXS loop-start circuit 1.

Signaling information between a GR-303 RDT 5 and the digital matrix switch 2 is transferred via a combination of a GR-303 Integrated Digital Terminal (IDT) 6 using non-standard Q.931 messages to setup and tear down timeslot allocation and robbed bit signaling for call control. SETUP and RELEASE COMPLETE messages flow from the GR-303 RDT 5 to the GR-303 IDT 6. Conversely, CONNECT and RELEASE messages flow from the GR-303 IDT 6 to the GR-303 RDT 5. Flash-hook signals flow from the GR-303 RDT 5 directly to the digital matrix switch 2, and ringing signals flow from the digital matrix switch 2 directly to the GR-303 RDT. To complete signal transmittal between the GR-303 RDT 5 and the digital matrix switch 2, off-hook and on-hook signals may be further integrated from GR-303 IDT 6 to the digital matrix switch 2. Conversely, a release signal may be integrated to traverse the gap between these two components in the opposite direction.

Signaling between a VoIP router 11 and a Media Gateway Control Protocol (MGCP) or H.323 VoIP interface 12 integrated with the digital matrix switch 2 may be completed by SETUP and RELEASE COMPLETE signals configured to transmit from the VoIP router 11 to the VoIP interface. Conversely, CONNECT and RELEASE messages may be further configured in the opposite direction between these components. Alternatively, a packet data link may bridge the gap between an embedded tone detector/generator 13 integrated with the VoIP router 11 and the VoIP interface 12. The two-way packet data link may be an Asynchronous Transfer Mode (ATM), 100baseT, OC3, or OC12 link.

Having described the local loop equipment interface with the EO switching components, reference is now directed to the remaining EO switching components illustrated in FIG. 1. In this regard, the network access side of the digital matrix switch 2 may include a Signaling System Number 7 (SS7) signaling stack 3, a plurality of tone detector/generator circuits 7, and a plurality of voice response circuits 9. In addition, the network access side of the digital matrix switch 2 may include an interface to a DLS 14 consistent with the system and method of the present invention. The DLS 14 operates at the interface between the physical connections to the telephonic interfaces (local loop equipment previously described) and a routing network.

Signaling between the EO switching components and the class 4 routing network and central equipment may be accomplished via a Signal Transfer Point (STP) 4 in communication with the SS7 signaling stack 3. Alternatively, a tandem transit switch 10 may be integrated to the digital matrix switch 2 via a DS1, a DS3, an OC3, or an OC12 voice circuit.

Figure 2:
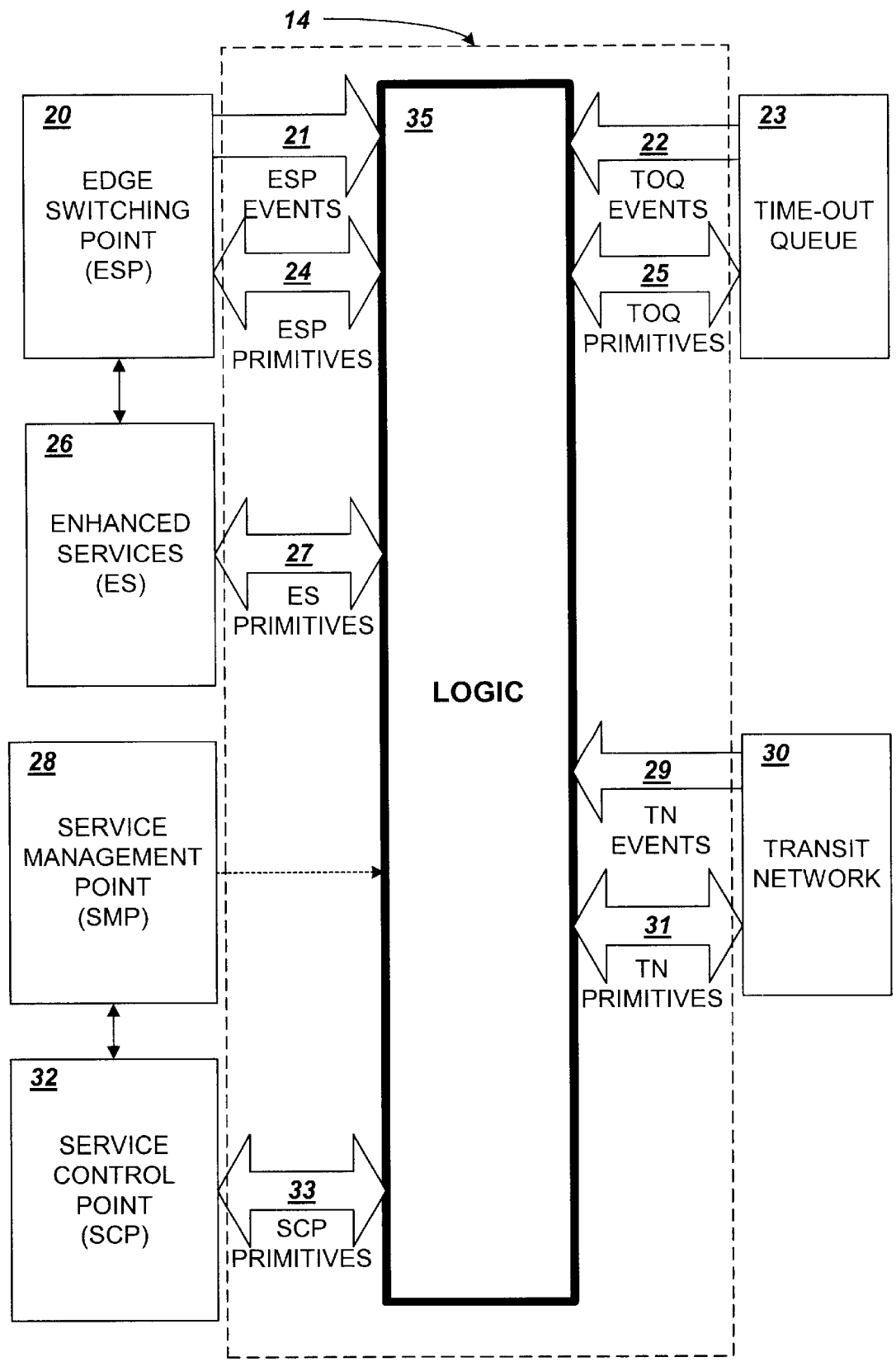
FIG. 2 is a block diagram illustrating the high-level inputs and outputs of the DLS introduced in FIG. 1.

Having described that portion of a PSTN 8 illustrated in FIG. 1, reference is now directed to FIG. 2. FIG. 2 further illustrates the DLS 14 introduced in FIG. 1. A End Office (EO) system may comprise an Edge Switching Point (ESP) 20, a Service Management Point (SMP) 28, and a Service Control Point (SCP) 32. The SMP 28 may be configured to dynamically distribute logic 35 programmed to implement class 5 functionality through the ESP 20 at the digital matrix switch 2 (see FIG. 1). As further illustrated in FIG. 2, the SMP 28 may be configured to dynamically update or modify logic 35. Having been provided with a plurality of functional programs, the logic 35 may interface with the ESP 20, enhanced services (ES) 26, the SCP 32, a Time-Out Queue (TOQ) 23, and the Transit Network (TN) 30 to connect and service customers integrated with the local loop equipment of the PSTN 8 (not shown). The logic 35 as illustrated in FIG. 2, may be programmed to receive ESP events 21, TOQ events 22, and Transit Network (TN) events 29. Logic 35 may be further programmed to both send and receive ESP primitives 24, ES primitives 27, SCP primitives 33, TOQ primitives 25, and TN primitives 31.

Figure 3:
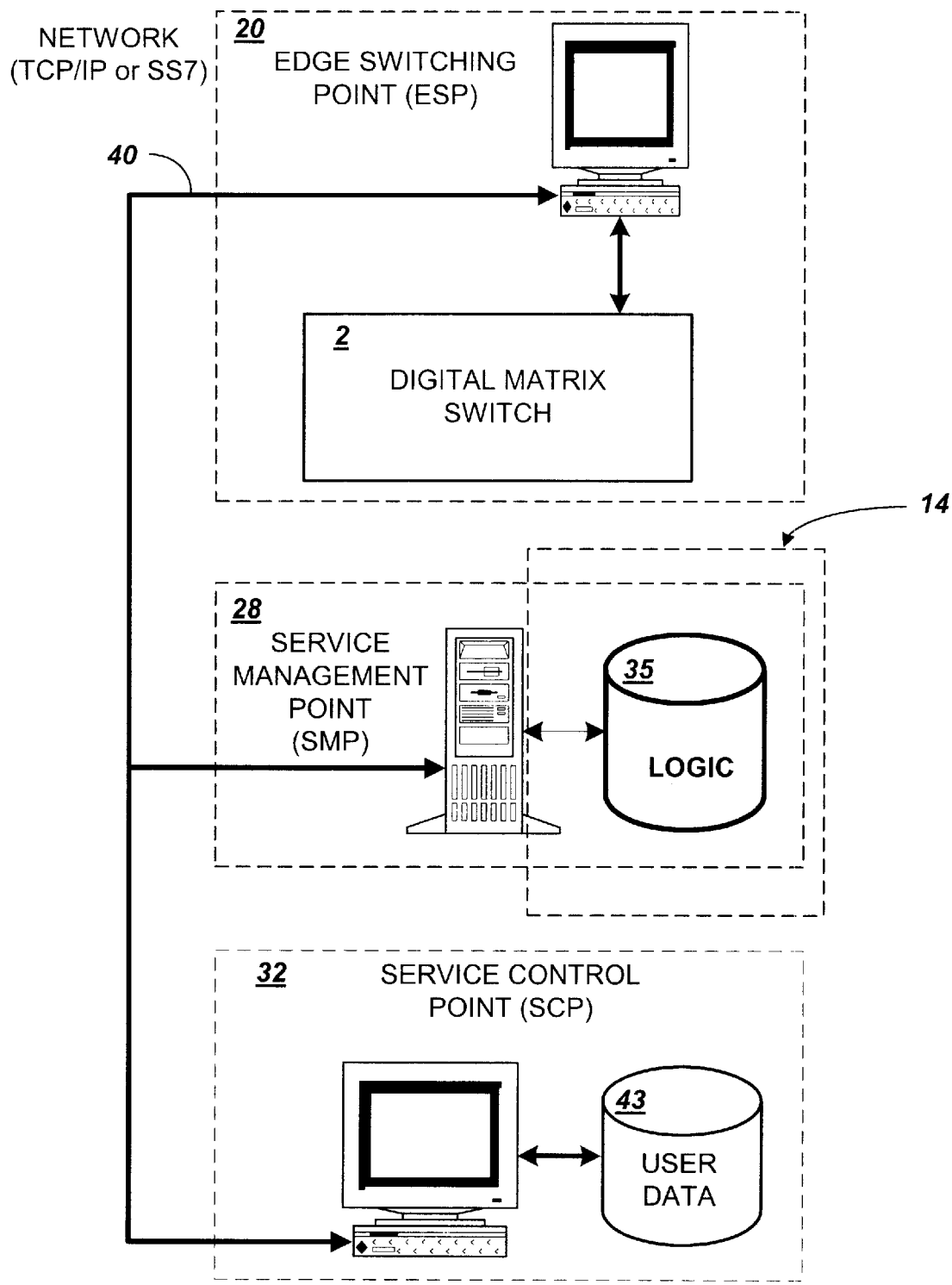
FIG. 3 is a block diagram further illustrating a system configured to distribute and support the DLS of FIG. 2.

Having introduced the hardware and interfaces of the DLS 14 in FIG. 2, reference is now directed to FIG. 3, which further illustrates a network hardware configuration that may be used to implement and maintain the operating system independent distributed self-contained dynamic logic system. In this regard, the DLS 14 may comprise the SMP 28 and the logic 35. As shown in FIG. 3, the ESP 20, the SMP 28, and the SCP 32 may be implemented with computers in communication with each other on a network 40. The network 40 may be a computer network capable of data packet transfer using TCP/IP or alternatively, the SS7 protocol. The logic 35 may control an ESP 20 and may be used to control a digital matrix switch 2 at an EO in the PSTN 8 (not shown).

The SMP 28 may be a standard computer capable of running the SCO-Unix Openserver 5.0 Operating System. The SMP 28 may also contain disk drives and SCSI disk controllers to enable persistent storage of data and service logic. The SMP 28 may be further integrated with an external data storage device capable of storing and retrieving the logic 35 under control of the SMP 28. The SMP 28 provides for management and distribution of the logic 35 of the DLS 14 in order to control the ESP 20.

The ESP 20 may be a standard computer capable of running the SCO-Unix Openserver 5.0 Operating System. The ESP 20 may also contain disk drives and SCSI disk controllers to enable persistent storage of data and the logic 35 of the DLS 14. The ESP 20 may be configured to manage the line interfaces and protocols and receives instruction from the SMP 28.

The ESP 20 may be implemented with a Cisco AS5300 access server modified to perform the methods described herein. To perform voice response, and voice recognition functionality, a series of Natural MicroSystems AG-Dual Span T1 Voice Processing cards (not shown) may be used. The AS5300 access server terminates digital bearer channels and provides direct conversion to packet networks for voice traffic.

The SCP 32 may be a standard computer capable of running the SCO-Unix Openserver 5.0 Operating System. The SCP 32 may be configured with disk drives and SCSI disk controllers to enable persistent storage of data. The SCP 32 may be further integrated with an external data storage device capable of storing and retrieving user data 43 under the control of the SCP 32. In this regard, the SCP 32 may provide subscriber data storage as further described herein.

It should be noted that the user database information which may be stored in the SCP 32, the distributed logic 35, and the SMP 28 for distribution to control one or more ESPs 20 may be embodied in any computer-readable medium for use or transport. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM or Flash memory) (electronic), an optical fiber (optical), and a portable compact disc read-only memory (CD-ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in computer memory.

II. SYSTEM LOGIC

The system and method of the present invention delivers class 5 functionality with embedded voice response and voice recognition utilizing a distributed self-contained logic system inserted between the physical circuit capabilities (signaling, tone generation, tone detection), and the transit networks. Although similar in capabilities to the IN architecture, this logic system is completely self-contained and does not depend nor utilize traditional IN network triggers. The logic 35 of the DLS 14 is managed by the SMP 28. The SMP 28 distributes and manages different versions of the logic 35 as required to implement the many combinations of selected services requested by individual telephone service customers. As previously described in relation to FIG. 2, the inputs to the logic 35 are signaling events and SCP 32 user data, the outputs are call establishment requests, tone generation primitives, and tone detection primitives (not shown). The signaling inputs include traditional analog loopstart signals such as off-hook, flash-hook, on-hook, as well as GR-303 messages like SETUP, CALL PROCEEDING, ALERTING, CONNECT, CONNECT ACKNOWLEDGE, DISCONNECT, RELEASE, and RELEASE COMPLETE. Call establishment requests include all of the necessary signaling data to establish a network call using any of the following ISUP call setup message parameter elements: Automatic Number Identification (ANI), Dialed Number Identification Service (DNIS), Redirect, Presentation Indicator, Progress Indicator, Automatic Number Identification Information Integers (ANI-II i.e., type of station), and Carrier Identification Code.

The logic 35 of the DLS 14 was developed using a machine independent software language capable of being installed or updated from a central location. In addition, the language must be of the type that can be parsed and compiled to make subsequent execution efficient, as call processing is a real time application. Software programming and scripting languages that meet these requirements include Java, Java Script, Pathologically Eclectic Rubbish Lister (PERL), and Python. All of these languages have mathematical and string processing capabilities as well as structured programming controls. Each of the above languages is either compiled or interpreted into universal operation code that is operating system and machine independent. Should the logic 35 require dynamic modification, and/or request that a remote feature execute locally, the new logic 35' (not shown) can be retrieved, parsed, and executed as required. The logic 35 can be distributed via Transmission Control Protocol/Internet Protocol (TCP/IP) as either an American Standard Code for Information Interchange (ASCII) text script file or machine independent compiled applets from a SMP 28 to control an ESP 20. It is important to note that the distributed logic 35 of the present invention is not limited to the software languages previously recited. In one embodiment of the present invention, the logic 35 is implemented using the PERL programming language. The DLS 14 disclosed herein is based on embedding a PERL interpreter between signaling events from a Class 5 switching endpoint and a Class-4 routing or transit network. The PERL interpreter is embedded [1], which means it is compiled into the C programming language software application which controls the digital matrix switch 2 (not shown). All telephony signaling events are passed to the PERL script in order to provide communication and event management with the ESP 20. Additionally, the PERL script may receive TN events 29 from the Class-4 routing and transit network. A station request is one example of a TN event 29. In addition, extensions were made to the PERL interpreter [1] which included a new set of commands for interacting with the ESP 20.

Embedding is a method of integrating a PERL language interpreter directly into an existing software application. Thus, the PERL source code is compiled into the application (or dynamically linked at run time) to produce a single executable entity for run time execution. Embedding provides a very efficient mechanism for calling or executing PERL instructions from within the software application.

Extending is a method of adding new functionality to the PERL language. These new commands can be used inside a PERL script which permits the PERL script to process telephony events as in the system of the present invention.

The logic 35 may be configured to provide a user modifiable state table for feature development. In this regard, the logic 35 of the DLS 14 is easily modified using any ASCII text editor.

A. LOGIC INPUTS

Logic 35 inputs may consist of SCP 32 data and events. In this regard, the SCP 32 data may contain user identification information associating a particular customer with a particular station on the digital matrix switch 2. In addition to user identification information, each station may be associated with a number of user selectable service features such as Caller Identification (CallerID), call waiting (CW), and the like. Events are characterized by user generated signaling changes such as on-hook, off-hook, flash-hook, or DTMF generated digit.

1. DATA

There are two kinds of data, static and dynamic. Static data requires service provider administrative intervention to alter. Dynamic data is user modifiable and may be automatically updated under certain conditions and is retained until subsequently modified. An example of static data may include directory numbers associated with network edge physical end-points. An example of dynamic data might include a last number redial, which changes each time a number is dialed. The dynamic data could be stored in volatile memory, while static data should be committed to non-volatile storage means such as a hard disk drive.

Each station may be provided with a permanently stored forwarding Directory Number (DN). The DN may be used to populate a Default Call Forward Field, which overrides the Call Forward Busy and Call Forward Ring No Answer fields, which may be supplied by a system administrator. The UNCONDITIONAL forward supersedes all other forward numbers, and is only maintained through a screen interface. In addition, supplementary feature indicators for Call-Waiting, and Call-Transfer may be stored either statically or dynamically.

a. STATION DATA

Each station represents a network end-point address representing a physical end point. Examples of these addresses include:

1. IDT: RDT: CRV. Defines an endpoint in a GR-303 signaling environment. This addressing scheme identifies a unique station location based on the physical equipment. The IDT (or Digital Subscriber Line Access Multiplexer (DSLAM)) is the central office integrated data terminal interface, while the RDT is the remote digital terminal. The CRV (station) is one of 2048 possible logical timeslot addresses on each RDT.
2. TCP/IP Address. Defines an endpoint in a VoIP network. This address would contain four numbers separated by periods to indicate parts of an address. A typical TCP/IP address might look like 132.147.160.100.
3. SPAN: CHANNEL. May define an endpoint in a small programmable switch environment when FXS Loopstart signaling is used where the span represents the T1 or T3 circuit identifier, and the channel represents the time slot offset within the span.
4. Time Slot. May define an endpoint in a small programmable switch environment like that provided by the Cisco VCO-4K switch described in this application.
5. Loop: Shelf: Card: Offset. A hierarchical addressing scheme for referencing hardware within a central office switching system.

Each end-point address may have data, state, and features associated with it. The data may include the different telephone numbers associated with the end-point. In this regard, telephone numbers may be used to map outbound calls to physical addresses. Other data might include forwarding numbers, billing numbers, accounting numbers, and possibly name and address data of the party using the end-point. End-point state information may include a service state for the end-point (in-service, out-of-service) and application related states like collecting digits, and releasing. Feature data might include indicators of which class features are enabled or disabled.

The following data definition may be used with the system and method of the present invention. Database index keys are indicated with a "**" in the "Contents" field.

TABLE 3

STATION BASED DATA

| Contents | Description |
|---|---|
| Station ID** | Address of this network endpoint. Could be IDT:RDT:CRV or TCP/IP Address or Timeslot |
| Service State | Contains the status of the station. |
| Billing Number | Provides a default billing number for when the subscriber number field is empty. |
| Dialing Capability | Local, Long Distance, International |
| Telephone Number1 ** | First number for CRV (Database KEY) |
| Telephone Number2 ** | Second number for CRV has different Ring Cadence (Database KEY) |

TABLE 3-continued

STATION BASED DATA

| Contents | Description |
| --- | --- |
| Telephone Number3 ** | Third number for CRV having different ring cadence. (Database KEY) |
| Last Inbound Call (dynamic) | Contains port, ANI, Date, and Time (Used for return calling function) |
| Last Outbound Call (dynamic) | Contains port, DNIS, Date, and Time (Used for repeat dialing) |
| Regional Special Number Entries | A special number entry for each special number. These include 311, 411, 611, 911 |
| Features Indicators | A set of flags that control the enabling and disabling of features associated with the physical set. |
| Forwarding Numbers | CFD, CFB, CFNA, CFU numbers for the various forwarding destinations. |
| Default Presentation Indicator | Default setting for whether the IAM should set the ANI number to be private or public. (CLIP/CLIR) |
| Acceptable Carriers | Mask of Acceptable Carriers (could have one for local, one for long distance, one for international). |
| Carrier Indicator Code | This is an override carrier indicator code used to select a carrier at a POP. This overrides the directly connected carriers. |
| ANI II Digits | The ANI II digits to use for calls originated by this CRV. |

TABLE 4

STATION OUTBOUND RESTRICTIONS

| Contents | Description |
| --- | --- |
| Station ID** | Station end-point identification (IDT:RDT:CRV, TCP/IP, SPAN:CHAN, Timeslot) |
| Telephone Number Pattern | Prefix with matching and wildcard characters to block certain dialing destinations (Compared to the DNIS.) |

TABLE 5

STATION INBOUND RESTRICTIONS

| Contents | Description |
| --- | --- |
| Station ID** | Station end-point identification (IDT:RDT:CRV, TCP/IP, SPAN:CHAN, Timeslot) |
| Telephone Number Pattern | Prefix with matching and wildcard characters to block inbound calls. (Compared to the ANI.) |

TABLE 6

STATION BASED SPEED DIAL ENTRIES

| Contents | Description |
| --- | --- |
| Station ID** | Station end-point identification (IDT:RDT:CRV, TCP/IP, SPAN:CHAN, Timeslot |
| Speed Dial Numbers (2–9, 20–49) | 8 single-digit numbers (2–9), and 30 two-digit numbers (20–49). |

The station data is indexed by both physical addresses and telephone number addresses. Thus, when a call is generated by a physical end-point, the features can be accessed directly, and the restricted numbers and speed dial numbers can be accessed directly as well. For calls directed to end-points, the telephone directory numbers may be used as efficient data search keys to obtain the end-point addresses for routing of the telephone call. The following table (Table 7) is a definition in the "C" programming language of the data structures defined above. A Call Reference Value (CRV) is considered a station when GR-303 signaling is used.

TABLE 7

STATION ACCOUNT CODE

```
/*
*========================================================
* crv.h: crv account and special number stuff
*--------------------------------------------------------
*/
#define MAX_SPECIAL_NUMBERS         5    /* how many spec nums can a
station have????? */
#define I_O_BND_RESTR_STR_SIZE           TELNUM_STR_SIZE /* in/outbnd
restriction str */
#define I_O_BND_RESTR_STR_LEN            (I_O_BND_RESTR_STR_SIZE-1)
/* dialing capability */
#define DIAL_CAP_LOCAL_CALLS             0x00000001UL     /* Local */
#define DIAL_CAP_LONG_DIST_CALLS   0x00000002UL     /* Long Distance
*/
#define DIAL_CAP_INTL_CALLS              0x00000004UL     /* International */
static toggle_t dial_cap_toggles[] = {
    {DIAL_CAP_LOCAL_CALLS,          "Local"},
    {DIAL_CAP_LONG_DIST_CALLS,       "Long Distance"},
    {DIAL_CAP_INTL_CALLS,           "International"},
    {0, NULL }
};
typedef struct {
    ulong mask[MAX_CRV_MASK];
} CrvMask_t;
typedef struct {
    ulong mask[MAX_CIDT_MASK];
```

TABLE 7-continued

STATION ACCOUNT CODE

```
} CidtMask_t;
/* Special number type */
typedef enum {
    SPEC_EMERGENCY,              /* emergency police/fire- 911 */
    SPEC_NON_EMERGENCY,          /* non-emergency police/fire- 311 */
    SPEC_CUST_SVC,               /* customer service- 611 */
    SPEC_DIRECT_SVC,             /* directory service- 411 */
    SPEC_MAX
} Spec_num_type_t;
/* Special number default digits */
char* spec_num_digits[] = {
    "911",
    "311",
    "611",
    "411",
    NULL
};
/* Special number object */
typedef struct {
    Db_id_t              spec_num_id; /* special number db record id */
/* need name or something for another LOOKUP KEY and to save in CRV ?? */
    Spec_num_type_t type;            /* special number type */
    char    digits_dialed[PHONE_STR_SIZE]; /* 911, 411, etc. */
    Telnum_t    target_number;          /* target telnum LOOKUP KEY? */
    char    desc[SPEC_DESCR_STR_SIZE]; /* description */
} Spec_num_t;
/* crv service state */
typedef enum {
    CRVST_OUT_OF_SVC, /* not sure these are it */
    CRVST_IDLE,
    CRVST_COL_INIT_DIG,
    CRVST_IN_SVC,
    CRVST_INVALID,
    CRVST_MAX
} Crv_svc_state_t;
/* RDT service state */
typedef enum {
    RDTST_OUT_OF_SVC,
    RDTST_UNKNOWN,
    RDTST_IN_SVC,
    RDTST_MAX
} RDT_svc_state_t;
/* CIDT type, need Manufacturers Enumeration */
typedef enum {
    CIDT_TYPE_1,
    CIDT_TYPE_2,
    CIDT_TYPE_3,
    CIDT_MAX
} CIDT_type_t;
typedef struct {
    Db_id_t     out_restr_id;       /* dbid */
    Db_id_t     crv_id;             /* Associated CRV */
    char prefix[I_O_BND_RESTR_STR_SIZE];   /* LOOKUP KEY */
} Outbnd_restrict_t;
typedef struct {
    Db_id_t     in_restr_id;        /* dbid */
    Db_id_t     crv_id;             /* Associated CRV */
    char prefix[I_O_BND_RESTR_STR_SIZE];   /* LOOKUP KEY */
} Inbnd_restrict_t;
typedef struct {
    Db_id_t     crv_speed_dial_id       /* dbid */
    Db_id_t     crv_id;             /* Associated CRV */
    Telnum_t    speed_entry[38];    /* 8 1 digit, and 30 2 digit numbers */
} CRV_speed_dial_t
/* Call information to store in memory */
typedef struct {
    /* port */
    time_t      call_time;
    char ani[PHONE_STR_SIZE];
    char dnis[PHONE_STR_SIZE];
} Last_call_t;
typedef struct {
    long cardNumber;    /* board/slot */
    byte span;          /* span */
    long offset;        /* offset from beginning timeslot,
                           0-23 for T1, 0-31 for E1 */
} DS0_chan_t;
```

TABLE 7-continued

STATION ACCOUNT CODE

```
typedef struct {
    Db_id_t       crv_id;                /* crv db record id, 16 bits for RDT
                                            number and 16 bits for CRV number */
    Crv_svc_state_t  state;              /* crv service state */
    char          billing[CRV_BILL_NUM_STR_SIZE];  /* billing number */
/* I think we want names for special numbers here */
    Db_id_t       spec_num_ids[MAX_SPECIAL_NUMBERS];
    short         dialing_cap;           /* dialing capability toggle */
    Telnum_t      telnum_1;              /* 1st num for crv LOOKUP KEY */
    Telnum_t      telnum_2;              /* 2nd num, diff ring LOOKUP KEY */
    Telnum_t      telnum_3;              /* 3rd num, diff ring LOOKUP KEY */
    CrvMask_t     features;              /* one long-word */
    Telnum_t      cfd_num;               /* call forward default */
    Telnum_t      cfb_num;               /* call forward busy */
    Telnum_t      cfna_num;              /* call forward ring no answer */
    Telnum_t      cfu_num;               /* call forward unconditional */
    byte          pres_ind;     /* default presentation indicator */
    ulong         carriers;              /* Carriers (like customer) */
    byte      ani_ii;           /* two-digit ANI-II */
    CIC_t         local_carrier;         /* CIC of Local Carrier to use of Equal Access
*/
    CIC_t         ld_carrier;            /* CIC of Long Distance Carrier for
Equal Access */
    CIC_t         intl_carrier;          /* CIC of International Carrier for Equal
Access */
} Crv_t;
```

2. EVENTS

The programmable logic 35 disclosed herein is used to process events. Events originate from several locations in the system of the present invention. More specifically, events originate from an edge station device, the class 4 routing or transit network 30, the integrated time-out queue 23 from within logic 35, and from ES processing ports.

Event processing is a mechanism for receiving an indication that a particular state change has occurred, followed by a stream of logic which may result in waiting for the next event. The logic stream processes the event, sets time-outs, and establishes an application state. As application states are determined, and transitions between application's states occur, the logic 35 will queue transmit primitives to both the edge station device and the class-4 routing or transit network.

a. EDGE SWITCH POINT EVENTS

The following events are defined to originate in the network edge device. These events are directly generated by the "station" for which EO functionality is provided. All ESP events 21 are directed towards the logic 35.

ESP_call_arrival(port_address, Station ID)

This event is a "trigger" sent from the ESP 20 to the logic 35 to indicate that a call has arrived. The port_address refers to the actual physical hardware address for the edge originated call. This is the address used for all tone detection, generation, and switching activities. The RDT:CRV address components are used to identify the subscriber endpoint in GR-303 originated calls. For cases when the GR-303 signaling is not used, the source address for identifying the subscriber is the actual hardware address indicated by the "port address" argument. The top 8 bits of the port address may be placed into the RDT field, and the bottom 8 bits may be placed into the CRV. This ensures that a RDT:CRV pair exists for every call. Upon receipt of this port address, the logic 35 generates a map to associate the physical port with the logical RDT:CRV address. This permits all subsequent events to be based on a RDT:CRV pair that defines the actual unique caller instance.

ESP_digits_received(STATION ID,Digit String)

This event is a "trigger" sent from the ESP 20 to the logic 35 to indicate that a digit has arrived. The digit string may contain one or more digits. The digits are utilized by the logic 35 to determine what to do.

ESP_flash_detected(STATION ID)

This event is a "trigger" sent from the ESP 20 to the logic 35 to indicate a "flash" has arrived.

ESP_answer(STATION ID)

This event is a "trigger" sent from the ESP 20 to the logic 35 to indicate an "answer" was detected on the previously placed call.

ESP_tone_complete(STATION ID)

This event is a "trigger" sent from the ESP 20 to the logic 35 to indicate a tone has completed playing. This may be used to trigger either a subsequent tone or the next event, such as, a recorded announcement.

ESP_released(STATION ID)

This event is a "trigger" sent from the ESP 20 to the logic 35 to indicate that the station is now on-hook.

ESP_port_parked(STATION ID)

This event is a "trigger" sent from the ESP 20 to the logic 35 to indicate that the other side of a connected call has released.

ESP_port_oos(STATION ID)

This event is a "trigger" sent from the ESP 20 to the logic 35 to indicate that the port which was carrying a particular station call has gone out-of-service.

b. CLASS-4 ROUTING OR TRANSIT NETWORK EVENTS

The Transit Network Event (TNE) may be used for sending and receiving calls from a transit network. The transit network may be implemented by a SS7 based Class-4 switching network.

TNE_station_wanted(STATION ID,Reference)

The ESP 20 sends this event from the routing network to the logic 35 when the transit network desires to complete a call to a signaling endpoint managed. The reference number may be used for future commands used to control the pending call.

c. TIME-OUT QUEUE EVENTS

This event is used for injecting an artificial event to check for or guard the arrival of anticipated events. The TOQ event 22 may also be used to provide an orderly transition for time-based features.

TOQ_timeout(STATION ID)

This event is a "trigger" indicating that a previously registered time-out has actually expired. Individual applications may take action based on the current state information associated with the application.

B. LOGIC OUTPUTS—PRIMITIVES

Both the ESP 20 and the Class-4 routing or transit network 30 may be controlled by primitive operations that were added to the PERL language via extensions. These primitives may be executed by the logic 35 as a response to received events and the current defined cumulative state based on previously received events. The sequence of primitives can be modified easily since the language is flexible and dynamically interpreted.

1. EDGE SWITCH POINT PRIMITIVES

Edge switch point primitives 24 (see FIG. 2) are a mechanism for the logic 35 to provide specialized services at the EO switch.

ESP_switch_listen(port address)

This primitive may queue the attachment of a DTMF or touch-tone digit detector to the port.

ESP_Switch_connect_tone(port address, tone, cycles, report)

This primitive may indicate the attachment of a tone to the port for a particular number of cycles. An option to report when the tone is complete is provided.

ESP_Switch_disconnect_tone(port address)

This primitive may indicate the disconnection of a tone from a port.

ESP_Switch_ignore(port address)

This primitive may indicate the removal of a DTMF or touch-tone digit detector from a port.

ESP_Switch_collect_digits(port address, digits, time-out)

This primitive may indicate the detection of an exact amount of digits within a particular time-out.

ESP_Switch_play_prompt(port address, prompt)

This primitive may indicate the playing of a prompt to a port for providing special messages.

2. CLASS-4 ROUTING OR TRANSIT NETWORK PRIMITIVES

Transit network primitives 31 (see FIG. 2) are a mechanism for the logic 35 to provide specialized services at the equal access end of an office switch.

TNE_process_call(port_address, RDT, CRV, CalledNumber, CallingNumber, Redirect, Reason, Progress, OLI, Presentation, Screening, CIC)

This primitive may be used to submit a call to the transit network for routing. All information required to route the call may be provided.

TNE_queue_outdial(reference)

This primitive may be used to direct the routing network to route a previously submitted call to the station.

TNE_requeue_outdial(reference, new_telnumber)

This primitive may be used to redirect the call for a particular station to another directory number as performed in call forwarding.

TNE_find_waiting_call(STATION ID)

This primitive may be used to locate a call for a station when a station owner "flashes" for call-waiting.

TNE_caller_gets_error(reference)

This primitive may be used to reject a call by reference for an invalid CRV.

TNE_caller_gets_busy(reference)

This primitive may be used to provide subscriber busy treatment for an inbound call to a station when the subscriber is on the phone.

TNE_connect_to_requestor(STATION ID, reference)

This primitive may be used to connect an inbound call to a station, with any previously connected caller going on hold. This may be used to toggle between calls when using call waiting.

TNE_connect_to_conference(Station ID, Conference ID)

This primitive may be used to connect an inbound or outbound call to a conference bridge.

TNE_conference_initiate(Station ID)

This primitive may be used to create a conference call (for up to 9 parties). The primitive returns a conference id used for further commands. The conference is automatically de-allocated when the station goes idle.

TNE_park_port(Station ID)

This primitive may be used to park the current station and any connected parties or conference.

TNE_release_port(Station ID)

This primitive may be used to hang-up stations when the station is already on hook. Thus, this is used to stop "ringing" a phone.

3. DATABASE PRIMITIVES

Database or SCP primitives 33 (see FIG. 2) are used to retrieve user information required to provide specialized service at the EO switch. The data may be requested through the following methods.

Station_valid(STATION ID)

This primitive returns TRUE or FALSE indicating that service is to be provided or denied for the CRV.

Station_dial_capabilities(STATION ID)

This primitive returns a bit mask of dialing capabilities.

Station_features(STATION ID)

This primitive returns a bit mask of feature capabilities.

Station_speed_dial(STATION ID,Index)

This primitive returns a number to dial for a particular speed dial entry. The primitive returns an empty string if the index is not defined.

Station_spel_num_read(STATION ID, Special_number)

This primitive returns a full telephone number which is appropriate for the station based on the special number dialed. This is used to translate 911, 611, 411, and 311 to the various real network addresses.

Station_forward_default_read(STATION ID)

This primitive returns the default forwarding number for a station.

Station_forward_busy_read(STATION ID)

This primitive returns the call-forward busy number for a station.

Station_forward_no_answer_read(STATION ID)

This primitive returns a call-forward no answer number for a station.

Station_forward_unconditional_read(STATION ID)

This primitive returns the call-forwarding unconditional number for a particular station.

Station_local_cic_read(STATION ID)

This primitive returns a carrier indicator code for local outbound calls for a particular station.

Station_Id_cic_read(STATION ID)

This primitive returns a long distance carrier indicator code for long distance calls from a particular station.

Station_pres_indicator_read(STATION ID)

This primitive returns a default presentation indicator for outbound calls made by a station.

Station_billing_read(STATION ID)

This primitive returns a billing number to use for all calls made by this station.

Station_primary_dir_number_read(STATION ID)

This primitive returns a default directory number for a station, which becomes the ANI for all outbound calls made from this station.

Station_alt1_dir_number_read(STATION ID)

This primitive returns a first alternate number for this station used in distinctive ring situations.

Station_alt2_dir_number_read(STATION ID)

This primitive returns a second alternate number for this station used in distinctive ring situations.

Station_speed_dial_write(STATION ID,Index, Number)

This primitive updates a speed dial index with a particular telephone number for a station.

Station_forward_unconditional_write(STATION ID,Number)

This primitive updates a call-forwarding unconditional number for a station.

Station_find_by_name(digits)

This primitive finds a station based on a last name, first name entry in the database. The primitive reports the number of matches found and an array of possible matches.

4. ENHANCED SERVICE PRIMITIVES

Enhanced service primitives 27 (see FIG. 2) are a mechanism for the logic 35 to provide enhanced voice directed services at the EO switch.

ES_play_prompt(STATION ID,prompt)

This primitive plays a prompt to a station.

ES_voice_recognition(STATION ID,vocabulary)

This primitive performs a voice recognition function on a station. The primitive returns two values, one is a index number which has meaning within the vocabulary. The second, is a score indicating how reliable the recognition was.

ES_text_to_speech(STATION ID,text)

This primitive turns the text into spoken speech for performing text-to-speech functionality. This could be used to speak names of calling parties, and possibly to speak messages to station owners.

ES_record_speech(STATION ID, minlength, maxlength)

This primitive records speech and returns a reference pointer to the recorded speech.

ES_playback_speech(STATION ID,reference)

This primitive plays the results of the ES record_speech ( ) primitive to a subscriber.

ES_arbitrate_list(list)

This primitive uses enhanced service resource ports to present a list of possible choices (as in a possible list of names found in a directory name search). The caller may select one from the list presented.

5. TIME-OUT QUEUE PRIMITIVES

TOQ primitives 25 (see FIG. 2) are a mechanism for the logic 35 to provide time-related responses at the EO switch.

Toq_insert(RDT:CRV, time-out value, time-out data);

This primitive provides a "future callback" which may contain the time-out data for determining what to do. The RDT:CRV becomes a "unique" key and is used to cancel the time-out if necessary.

Toq_remove(RDT:CRV)

This primitive provides for the removal and cancellation of all pending time-outs for the RDT:CRV.

C. FEATURES

To illustrate the invention, a list of Class-5 features is presented below. The list is representative of the standard Class-5 features supported and described in the above set of reference standards.

1. 3 DIGIT NUMBERS OF A PATTERN—N11

These numbers will force an immediate connection to either a singular number, or routing to a number based on the ANI of the caller. Entries for specifying the location of these services may be stored in the call routing table.

311 Non-Urgent Police/Fire

411 Information

611 Service

911 Emergency

Non-Emergency Police/Fire (311)

This feature provides means for connecting a particular station to the nearest police or fire dispatcher without knowing the number. The 311 service is identical to 911, with the exception that the call is assumed to be non-urgent. One other distinction is that, should the station end hang-up, the call is cleared.

Callers Experience:

The caller will pickup the telephone, and hear a dial tone. Upon dialing the first digit (a '3'), the dial tone will stop playing, and there will be silence on the line. The time-out before expecting another digit will be very long. The subsequent '1' is entered, and when the second '1' is entered, the call will immediately be connected to the appropriate police/fire number. If either side hangs up, the call is cleared.

Static Data Requirements:

Each station will need to be provisioned with a "Police/Fire Dispatch" number, or use a generic number based on a numbering plan area (NPA) more commonly known as an area code, or use a geographic determination of the correct location to dial.

Directory Service Request (411)

This feature provides means for connecting a particular station to directory service without knowing the number. This service is identical to the 611 service, with the exception that a "release link" transfer option is supported through either "flash" or TCP/IP signaling from the operator service center.

Callers Experience

The caller will pickup the telephone, and hear a dial tone. Upon dialing the first digit (a '4'), the dial tone will stop playing, and there will be silence on the line. The time-out before expecting another digit will be very long. The subsequent '1' is entered, and when the second '1' is entered, the call will immediately be connected to the appropriate directory service number. If either side hangs up, the call is cleared. If the operator side "flashes", then an address is collected and the callers call is re-routed. There is an equivalent mechanism for supporting TCP/IP.

Static Data Requirements

Each station will need to be provisioned with a "Directory Service" number, or use a generic number based on NPAINXX or geographic determination.

Customer Service (611)

This feature provides means for connecting a particular station to customer service without knowing the number. The 611 call is assumed to be non-urgent, and all features are enabled for the duration of the call, including call waiting. The "presentation indicator" is always forced to forward the ANI to the customer service attendant.

Callers Experience:

The caller will pickup the telephone, and hear a dial tone. Upon dialing the first digit (a '6'), the dial tone will stop playing, and there will be silence on the line. The time-out before expecting another digit will be very long. The subsequent '1' is entered, and when the second '1' is entered, the call will immediately be connected to the appropriate customer service number. If either side hangs up, the call is cleared. During the call, call-waiting tone will be heard when an inbound call arrives for the station. When the tone is heard, a flash will place the customer service number on hold, and the station will be connected to the inbound call. Another "flash" returns the station to the customer service number.

Static Data Requirements:

Each station will need to be provisioned with a "Customer Service" number, or use a generic number based on NPA/NXX or geographic method.

Emergency Police/Fire (911)

This feature provides means for connecting a particular station to the nearest police or fire dispatcher without knowing the number. The call is assumed to be urgent. Should the station end hang-up, the call is not cleared, and the connection is maintained. This permits the station to be permanently connected to the 911 operator until the 911 operator releases the call.

Callers Experience:

The caller will pickup the telephone, and hear a dial tone. Upon dialing the first digit (a '9'), the dial tone will stop playing, and there will be silence on the line. The time-out before expecting another digit will be very long. The subsequent '1' is entered, and when the second '1' is entered, the call will immediately be connected to the appropriate police/fire number. Once the 911 operator hangs up, the call is cleared. Otherwise, the station remains connected to the 911 operator.

Static Data Requirements:

Each station will need to be provisioned with a "Police/Fire Dispatch" number, or use a generic number based on NPA/NXX or geographic location.

2. STANDARD CALLING

Simple Outbound Calling

If a caller enters a normal 7 or 10 digit North American numbering plan (NANP) number or an international number, then the call will be completed to the desired destination. The inbound call interaction (creating a call-waiting condition) is shown, but wouldn't occur if the subscriber had disabled call-waiting, or the feature was administratively disabled. Thus, it is the responsibility of the EO logic to determine if the feature is to be available at time of use. This is required for the scenario when a subscriber is already engaged with an original call and a call-waiting call, and a subsequent call arrives which would result in a busy treatment to the last incoming call.

Callers Experience:

The caller will pickup the telephone, and hear a dial tone. Upon dialing the first digit, the dial tone will stop playing, and there will be silence on the line. The time-out before expecting another digit will be very long. The digits are entered. If a "local" pattern is detected by use of the logic 35 pattern matching, then the call is completed without delay. For numbers which are entered as international, a time-out or "#" is used to terminate digit collection. If either side hangs up, the call is cleared.

Outbound call restrictions may be applied when the call enters the "Outdial State". If the call is to a restricted address (defined by the administrator on a subscriber basis), then failed call treatment is provided. Invalid phone numbers detected by the dial-plan, or valid destinations that are not allowed by the call type or carrier configuration are provided failed call treatment as well. Failed call treatment begins with a special intercept tone (SIT) followed by an announcement (different one for each failure) followed by a numeric code indicating diagnostic information.

Prefixing the number with a *70 will disable call waiting for the duration of the call. If call waiting is disabled, the inbound call is not introduced into the state diagram.

Prefixing the number with a *67 will set the outgoing presentation to block caller ID at the receiving end.

Static Data Requirements:

All outbound call restriction patterns for each station need to be stored in the database. Additionally, dial-plan resolution of telephone numbers needs to be supported for further validation. Local, long distance, and international call restrictions need to be checked.

For each station, both the default presentation indicator, and the override value must be retained. The override value is reset when the call is cleared.

For each station, both the default caller waiting availability and the call by call override value must be retained. The override value is reset when the call is cleared.

Return Caller Service (*69)

This feature provides means for connecting a particular station to an inbound call attempt without knowing the number. The call is assumed to be an outbound call like any other, but the number is retrieved from the static data store.

Callers Experience:

The caller will pickup the telephone, and hear a dial tone. Upon dialing the first digit (a '*'), the dial tone will stop playing, and there will be silence on the line. The time-out before expecting another digit will be very long. The subsequent '6' is entered, and when the second digit, '9,' is entered, the call will immediately be connected to the last inbound attempt (answered or unanswered) number. If either side hangs up, the call is cleared.

Should there be no "last inbound attempt number" registered in volatile memory, then the system will provide error treatment.

The *70 and *67 features can't be combined with the *69 feature. Thus, the default presentation indicators, and the default call-waiting status is used for all *69 calls. Carrier selections used include only the default carrier.

Static Data Requirements:

Each station will have temporarily stored the last inbound number attempted. This data will be kept in volatile memory, so that a system restart will "clear" the last inbound number.

Last Number Redial Service (*9)

This feature provides means for connecting a particular station to the last number dialed not knowing the number. The call is assumed to be an outbound call like any other, but the number is retrieved from the static data store.

Callers Experience:

The caller will pickup the telephone, and hear a dial tone. Upon dialing the first digit (a '*'), the dial tone will stop playing, and there will be silence on the line. The time-out before expecting another digit will be very long. Once the subsequent '9' is entered, the call will immediately be connected to the last number dialed (not a feature number, but valid telephone number). If either side hangs up, the call is cleared.

Should there be no "last dialed number" registered in volatile memory, then the system will provide error treatment.

The *70 and *67 features can't be combined with the *9 feature. Thus, the default presentation indicators, and the default call-waiting status is used for all *9 calls. Carrier selections are not retained. Thus, only the default carrier is used.

Static Data Requirements:

Each station will have temporarily stored the last number outbound attempt. This data will be kept in volatile memory, so that a system restart will "clear" the last inbound number.

Forwarding (*72, *42, *68)

This feature provides means for setting the forwarding number.

Callers Experience:

The caller will pickup the telephone, and hear a dial tone. Upon dialing the first digit (a '*'), the dial tone will stop playing, and there will be silence on the line. The time-out before expecting another digit will be very long. The subsequent 2 digits are entered (72, 42, 68), and the caller will hear a secondary dial tone. This dial tone will indicate that the forwarding telephone number should be entered. Only valid telephone numbers can be entered. (*70, *67, *69, *9, and speed dial features do not function here). Carrier selection indicators are not permitted, thus only the default carrier is utilized for these destinations.

If the telephone number is valid, the caller will hear a "confirmation tone" which consists of three short tones. For *42 and *68, this will be followed by a subsequent dial tone requesting the caller to enter the number of rings (0–9) before forwarding. If the caller hangs up, the system wide default of RINGS BEFORE FORWARD is used, and the call forwarding is enabled. If a single digit (0,1,2,3,4,6,7,8,9) is entered, then the caller will hear a second confirmation tone. The call is then released.

NOTE: This behavior is slightly different from standard. First, the destination is not verified to ensure the destination is reachable. Second, the destination need not answer. Third, rings to forward may be set in the same step.

Static Data Requirements:

Each station will have permanently stored a forwarding directory number (DN). This forward destination will populate the Default Call Forward Field, which overrides the Call Forward Busy and Call Forward Ring No Answer that may be supplied by a system administrator. The UNCONDITIONAL forward supersedes all other forward numbers.

Receiving Calls

Terminate inbound calls for a subscriber on an endpoint based on a physical address stored for each subscriber. The mechanism will receive an inbound call from the network side (SS7) where the DNIS will be validated in the station database, and the associated subscriber will be validated for billing status. The call will be extended to the station with the ANI as part of the "outseizure" request.

Callers Experience:

Subsequent calls to an occupied station address (detected in ESP 20) will receive a BUSY tone if no supplementary services are enabled for the subscriber. For situations where a station is out-of-service or a subscriber has an invalid status, the caller will receive a SIT and an announcement of the condition. For stations with call waiting enabled, the caller will receive a RINGBACK at the station and the ESP 20 will generate a call-waiting tone. An optional FSK burst may be provided for callers with enhanced call waiting. If a flash signal is detected, and there is no caller waiting, and the TRANSFER feature is enabled, provide a dial-tone, collect an address, and then effect a transfer of the inbound call to the newly entered destination.

Alternatively, for a station with call waiting enabled, provide FORWARDING to call forwarding universal (CFU) or call forwarding destination (CFD) as follows:

1. When the CFU number is registered for all calls to this station or
2. When the CFD number is registered for all calls to this station.

When the CFU and CFD are undefined, provide FORWARDING when Busy is detected to the call forward busy (CFB) number registered. Similarly, provide FORWARDING when NO ANSWER is detected on the DEFINED NUMBER OF RINGS to the call forward no answer (CFNA) number registered.

3. 3 DIGIT FEATURE REQUESTS OF A PATTERN *AX.

These feature selectors may be recognized and based on the feature, perform certain actions. The feature selectors may be modifiable and changeable to suit the local requirements.

*69 Extend a call to the last answered or unanswered inbound call.

*70 <address> Disable call-waiting for this address.

*57 Malicious call trace request (last inbound answered or unanswered call).

*73 Cancel call forwarding.

*72 <address> All calls forward (immediate).

*42 <address> Call forward on ring no answer override.

*68 <address> Call forward busy/ring no answer.

*74 <1 digit code><destination> Activate speed dial 2–9.

*75 <2 digit code><destination> Activate speed dial 20–49.

<1 digit code># Dial speed dial number.

<2 digit code># Dial speed dial number.

4. OPTIONAL 7 DIGIT EQUAL ACCESS CARRIER SELECTION OF A PATTERN 10XXXXX

[101cccc]0[#, time-out] Operator assistance.

[101cccc]0<address> Collect or operator assisted call with valid local, national, or international address.

5. A VALID PSTN ADDRESS: (Denoted above as <address>).

011<international phone number>[#, TO] International call with optional carrier selection.

1<10 digit national number> Long-distance call with optional carrier selection. 7 digit local address 1–5 digit extension[#, TO]

III. DISTRIBUTION AND ACTIVATION OF SYSTEM LOGIC

It is an objective of this invention to embody a class 5 switch by intercepting edge switch events, issuing switching primitives, and establishing and tearing down calls on a routing network. The logic 35 which embodies the class 5 switch will be dynamically loaded, and will include extensions to operate with voice response circuits 9, SCPs 32, and traditional database architectures. These extensions will provide many new features, and greatly enhanced user interfaces for existing features.

Complex feature creation and distribution will be possible by distributing this logic to switching end-points for use on demand. Thus complex IN like features will be created and distributed to end-office locations in a uniform manner. The solution scales because the high number of "trigger" interaction points are managed by the distributed logic 35, instead of round trip communications to an SCP 32, as defined in the IN architecture.

Configuration changes are "journalized" onto a persistent data storage device, such as a hard disk, on the SMP 28. This provides a permanent record of the configuration change should the SMP 28 lose power or get restarted. The change may have been submitted by any network element. The change may be a modification to a "PERL" source file, or the inclusion of a new "PERL" source file.

For example, if the SMP 28 receives a transaction which modifies a PERL script called "DLS.pl" to permit dialing "*SP" to reach the state police in addition to 911, the SMP 28 would write a journal entry to the hard disk. The configuration journal number would be incremented and assigned to this journal entry.

The method of transporting the PERL logic 35 source files to each ESP 20 is based on a polling algorithm. Each ESP 20 will periodically "ping" the SMP 28 with a data packet containing monitoring and operational statistics. The response to the "ping" provides information about which configuration changes need to be processed.

The network operates as follows. Messages on the network are based on a reliable datagram method such as common management interface protocol (CMIP) over TCAP or user datagram protocol (UDP). On startup, SMP 28 reads its configuration from its local database. Initially, there is no configuration at all. The ESP 20 periodically contacts the SMP 28 by sending a "ping" message in response to a reliable datagram. The "ping" contains the configuration journal number, as well as, operational statistics for monitoring purposes as illustrated in Table 8 below.

TABLE 8

ESP "Ping" Message

| Information | Purpose |
| --- | --- |
| ESP Address | An Address of the ESP device communicating with the SMP. |
| Configuration Journal Number | This is an integer that contains the number of configuration transactions that have occurred to date (since network installation). This integer can be used to check the accuracy of the distributed configuration data. |
| Operational Statistics | Transactions per second, memory and disk space requirements, alarms, etc. Any data that is to be monitored by the SMP. |

The SMP 28 responds to the ESP 20 with a message containing the information shown in Table 9 below.

TABLE 9

SMP "Ping" Response

| Information | Purpose |
| --- | --- |
| List of SCPs | A complete list of database servers and their addresses, with information about which "fragments" of the account population are served. The current service state of each server is indicated. |
| Configuration Journal Number | This is an integer that contains the number of configuration transactions that have occurred to date (since network installation). This integer can be used to check the accuracy of the distributed configuration data. |

The ESP 20 receives the response from SMP 28, and checks the configuration journal number. If the SMP 25 has a journal number that is greater than the ESP 20, then the ESP 20 must request sequentially all of the entries that have not been processed. Thus, if the ESP's 20 configuration journal entry number is 7, and the SMP 28 has a configuration journal number of 10, the ESP 20 must ask for and process configuration changes 8, 9, and 10. The above process repeats itself continually with a programmable interval between "ping" messages. The latency on updates of configuration data is based solely on the frequency of the "ping" message.

The configuration change mechanism may function as follows. When an ESP 20 or a SCP 32 discovers that its configuration database is on or more transactions behind the SMP 28, it sends requests to the SMP 28 for those particular journal entries. The SMP 28 replies with the entries and they are applied to the local database and served to other hosts on the network. Thus, all hosts (computing entities) will have a copy of the configuration database, which is exactly the same. When a "PERL" script changes, the source text file of the PERL program will be copied by the ESP 20 using either FTP or TFTP or a packet approach which might be stored in a local directory. Next, the ESP 20 will activate the change by:
1. Checking to see if the PERL script is in use on the system.
2. If the PERL script is not in use the change is executed.
3. If the PERL script is in use, the ESP 20 will send a notification of DLS_CHANGE to all processes that require such notification. Those processes will then dynamically load the PERL script as required.

IV. CALL PROCESSING FLOW

Figure 4:
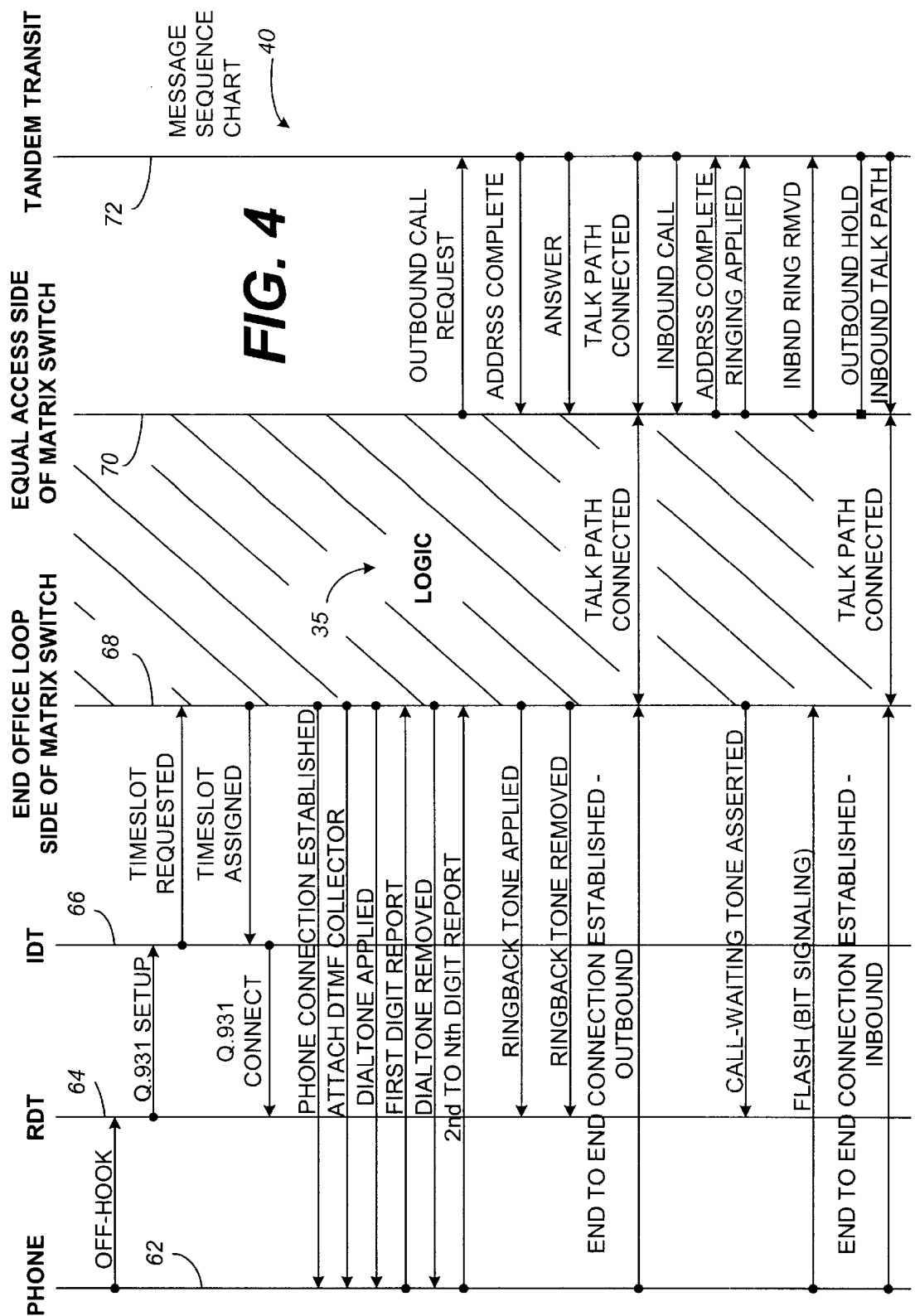
FIG. 4 is a message sequence chart illustrating how the logic of the DLS of FIG. 2 interacts with the different functional interfaces of an EO switch for the three different configurations shown in FIG. 1.

Having introduced the DLS 14 at a high level in FIG. 2, and further describing the DLS in FIG. 3, reference is now directed to FIG. 4 which illustrates how the logic of the DLS 14 of FIG. 2 is applied at the EO digital matrix switch 2 previously illustrated in FIG. 1. In this regard, a message sequence chart 40 may include a phone 62, a RDT 64, an RDT 66, an EO loop side of matrix switch 68, an equal access side of matrix switch 70, and a tandem transit 72. It is important to note that logic 35 of the DLS 14 previously introduced is applied at an edge device (not shown) between the physical connections to the telephonic interfaces and routing network interfaces. FIG. 4 illustrates the sequential functional interfaces necessary to establish a first two-party call, as well as, a second two-party call in response to an inbound call directed to a phone with a call-waiting feature enabled. Each of the functional interfaces in the sequence are illustrated as one scans FIG. 4 from left to right starting at the upper left hand portion of the illustration and proceeding to the bottom of the figure. More specifically, a user may initiate a first two-party call by signaling a call initiation request by lifting a receiver and sending an off-hook signal from the phone 62 to the RDT 64. The RDT 64 having received the off-hook signal sends a Q.931 setup signal to the IDT 66. The IDT 66 having received the Q.931 setup signal sends a timeslot request to the EO loop side of matrix switch 68. Having received the timeslot request signal, the logic 35 returns a timeslot assigned signal to the IDT 66 via the EO loop side of matrix switch 68. Having received the timeslot assigned signal from the logic 35 and the EO loop side of matrix switch 68, the IDT sends a Q.931 connect signal to the RDT 64. Having received the Q.931 connect signal from the IDT 66, the RDT 64 establishes a connection from the EO loop side of matrix switch 68 through to the phone 62. Once a phone connection is established, the logic 35 attaches a DTMF tone collector and applies a dial tone on the connection to the phone.

Having received a dial tone, the first digit depressed by a user of phone 62 results in a first digit report signal from the phone 62 to the EO loop side of matrix switch 68. The first digit report signal is detected by the logic 35. Upon receiving the first digit from the phone 62, the logic 35 removes the dial tone from the connection. After receiving the $2^{nd}$ to Nth digit report from the phone 62, at the EO loop side of matrix switch 68, the logic 35 processes and sends an outbound call request via the equal access side of matrix switch 70. The tandem transit network 72, having received the outbound call request locates and connects the desired remote station and awaits an indication that the complete address has been received at the remote switch serving the remote station.

Having received an indication that the address is complete, tandem transit network 72 sends an address complete signal to the logic 35 via the equal access side of matrix switch 70. The logic 35 then arranges for a ringback tone via the EO loop side of matrix switch 68 to the RDT 64. The ringback tone continues either until the destination party answers the call, or the phone 62 terminates the call attempt by placing the phone back on-hook. Once an answer signal is received from the tandem transit network 72 at the logic 35 via the equal side of matrix switch 70 the logic 35 establishes a talk path connection for the first two-party call.

A second two-party call in response to an inbound call directed to the phone 62 with a call-waiting feature enabled may be established as follows. First an inbound call signal is sent from the tandem transit network 72 to the logic 35 via the equal access side of matrix switch 70. The logic 35 having received the inbound call signal issues an ACM signal back to the tandem transit network 72. Simultaneously, the logic 35 issues a call-waiting tone via the EO loop side of matrix switch 68 via the established connection to the RDT 64. The call-waiting tone continues indefinitely until either the phone 62 issues a flash signal, or the inbound calling station returns the remote phone on-hook. Upon receiving a flash signal from phone 62, the logic 35 removes the inbound ringing signal from the remote caller by issuing a remove inbound ringing signal via the equal access side of matrix switch 70 to the transit tandem network 72. Next, the logic 35 issues an outbound hold signal between the same two devices. The logic 35 then establishes a talk path between phone 62 and the second calling party.

A. OUTBOUND CALLS

Calls originating from a station may have the following event processing logic performed by the logic 35. The flowcharts of FIGS. 5–27 show the architecture, functionality, and operation of a possible implementation of the logic 35. In this regard, each block represents a module, segment, or portion of code, which comprises one or more executable instructions for implementing the specified logical function(s). It should also be noted that in some alternative implementations, the functions noted in the blocks might occur out of the order noted in FIGS. 5–27. For example, two blocks shown in succession may in fact be executed substantially concurrently or the blocks may sometimes be executed in the reverse order, depending upon the functionality involved. In this regard, FIGS. 5–27 illustrate the processing logic as applied by the system to process outbound calls.

Figure 5:
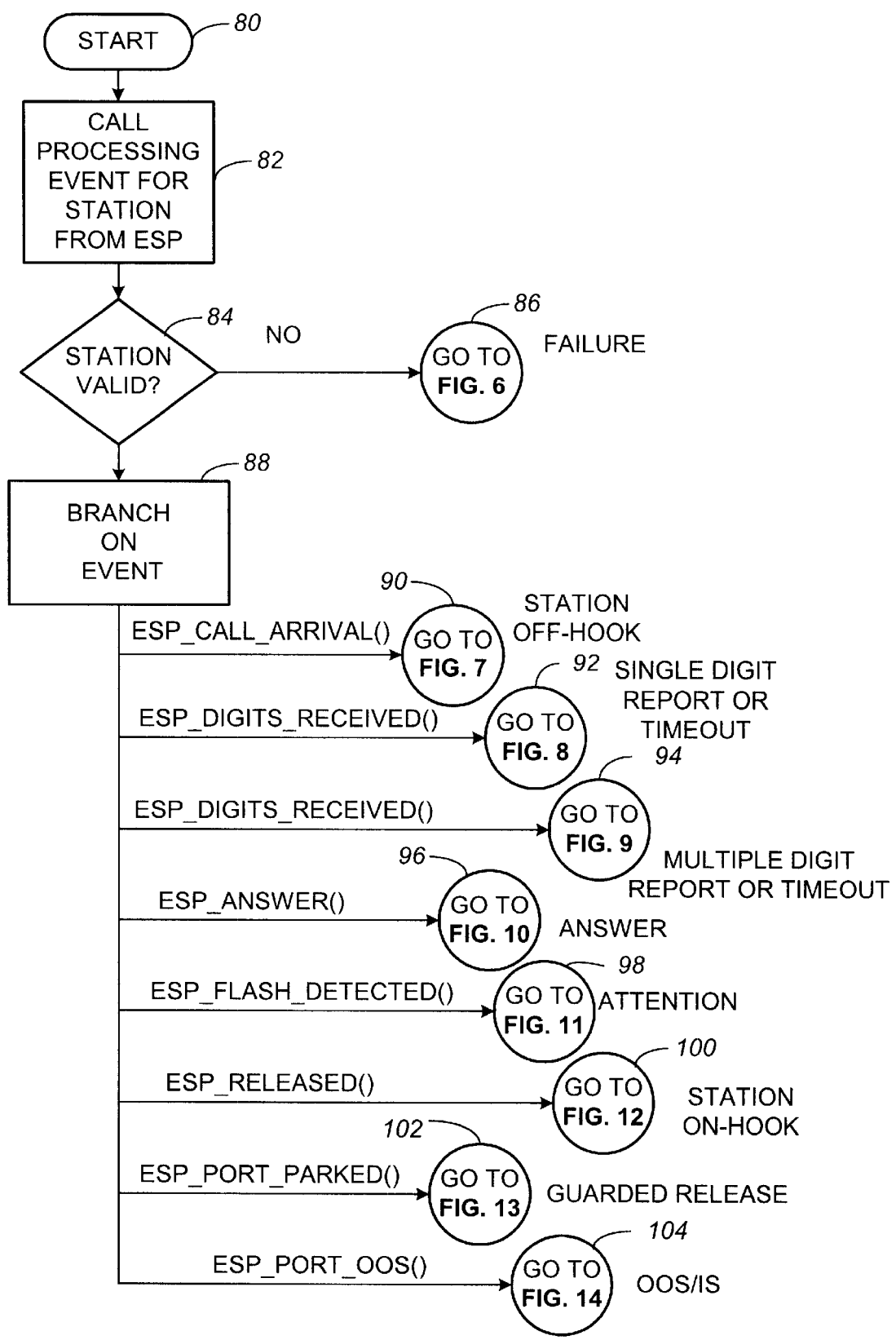
FIGS. 5–27 present different portions of a flowchart illustrating station outbound call event processing as further described below.
Figure 7:
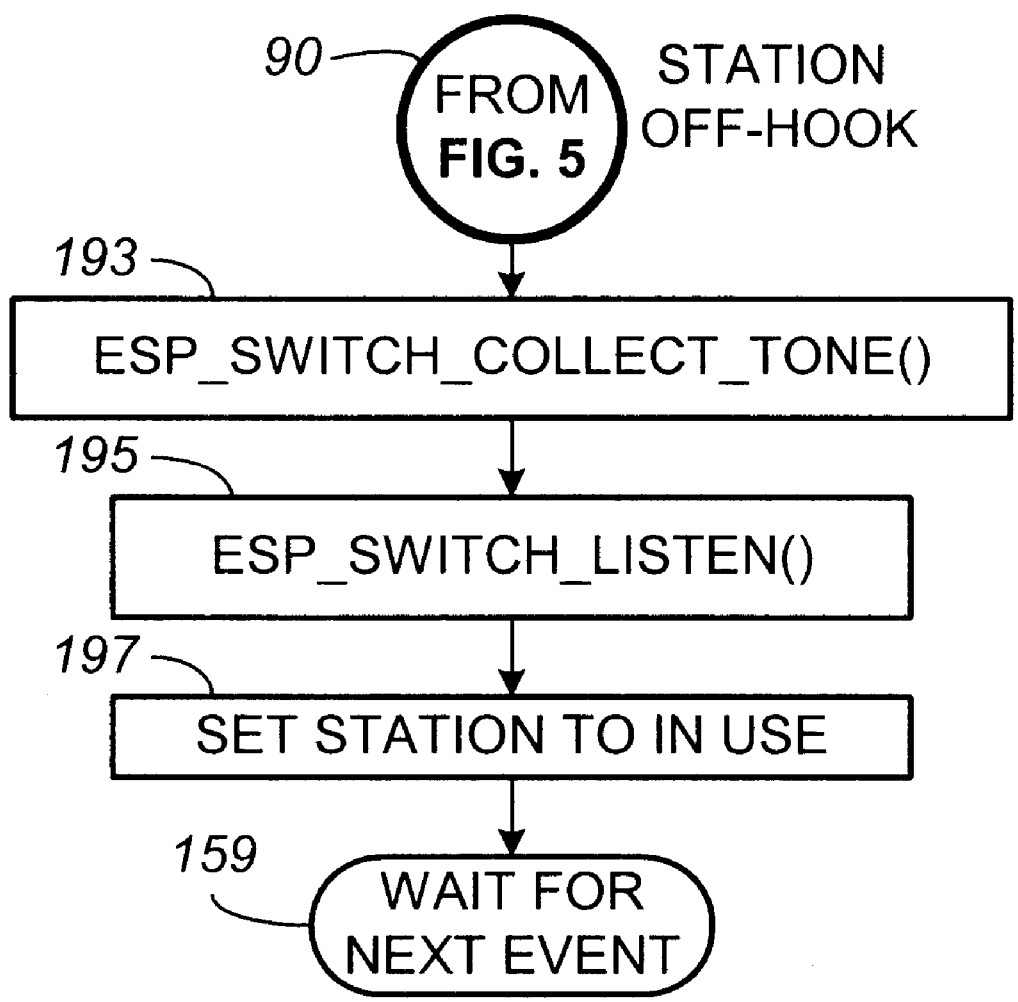
Figure 8:
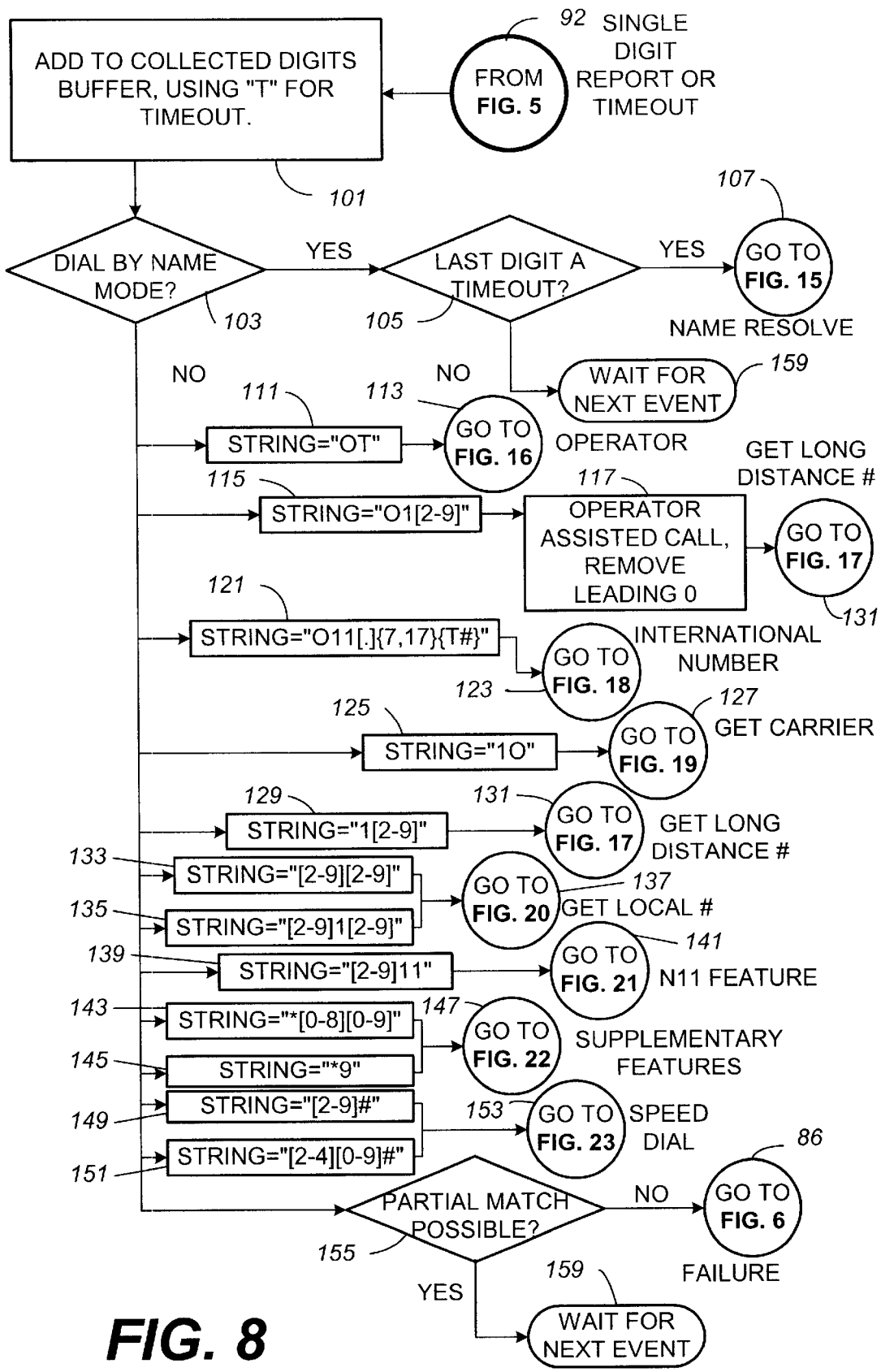
Figure 9:
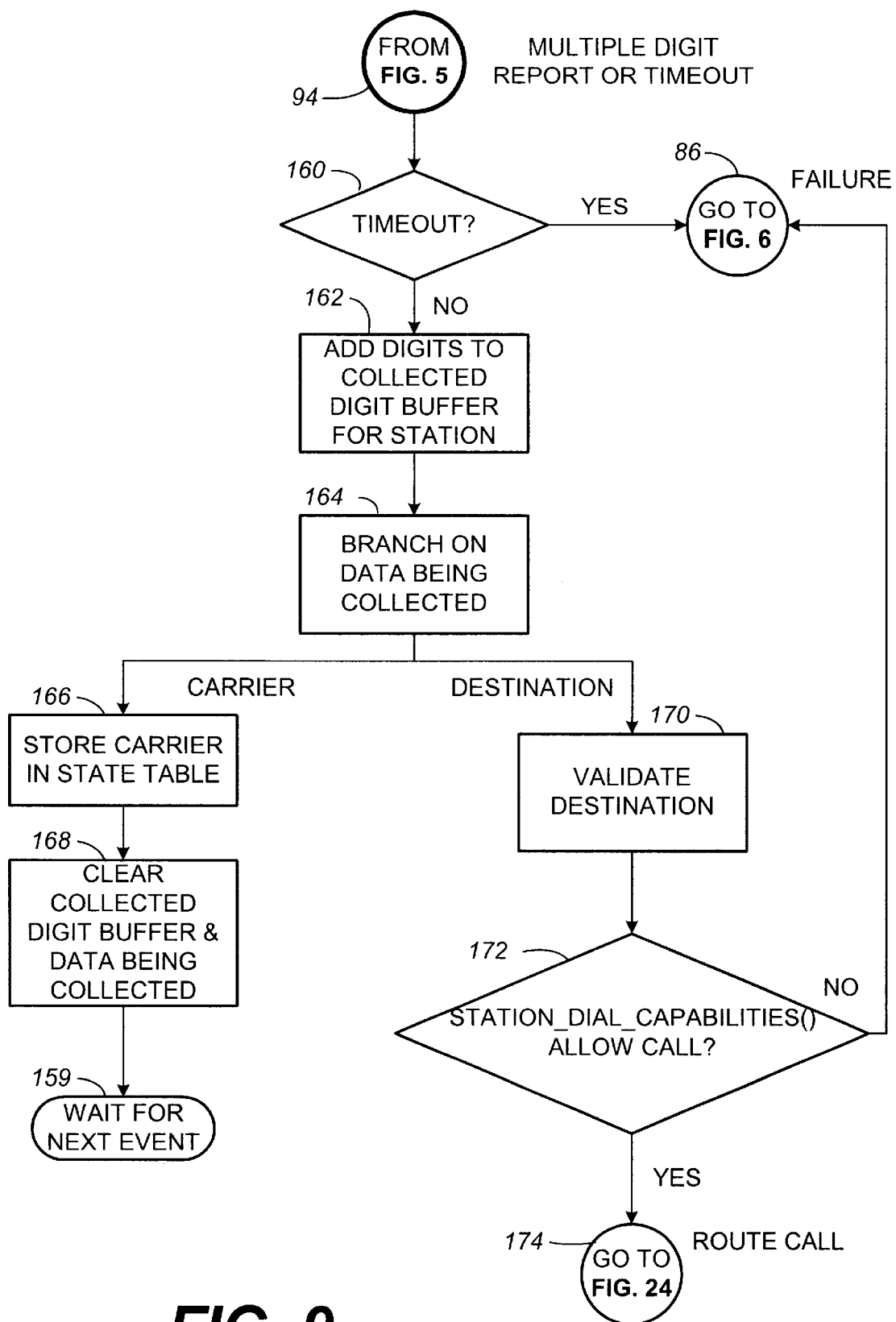
Figure 10:
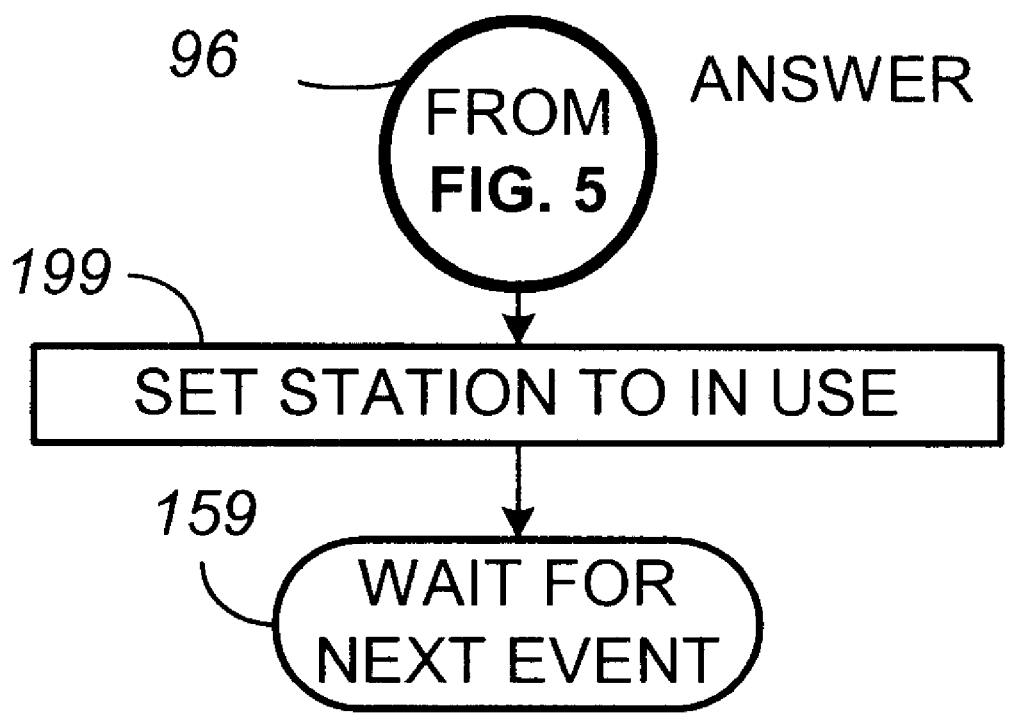
Figure 11:
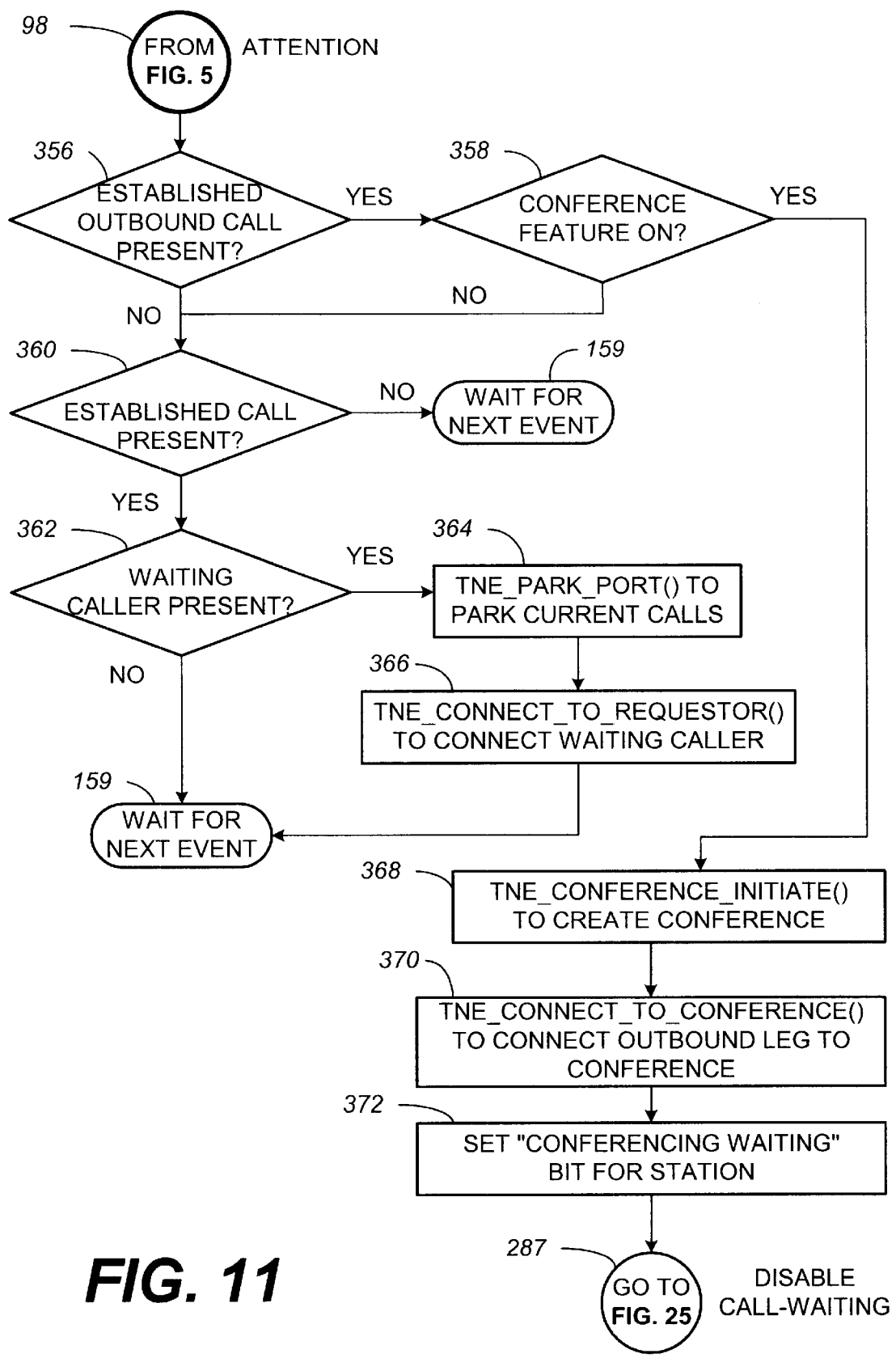
Figure 12:
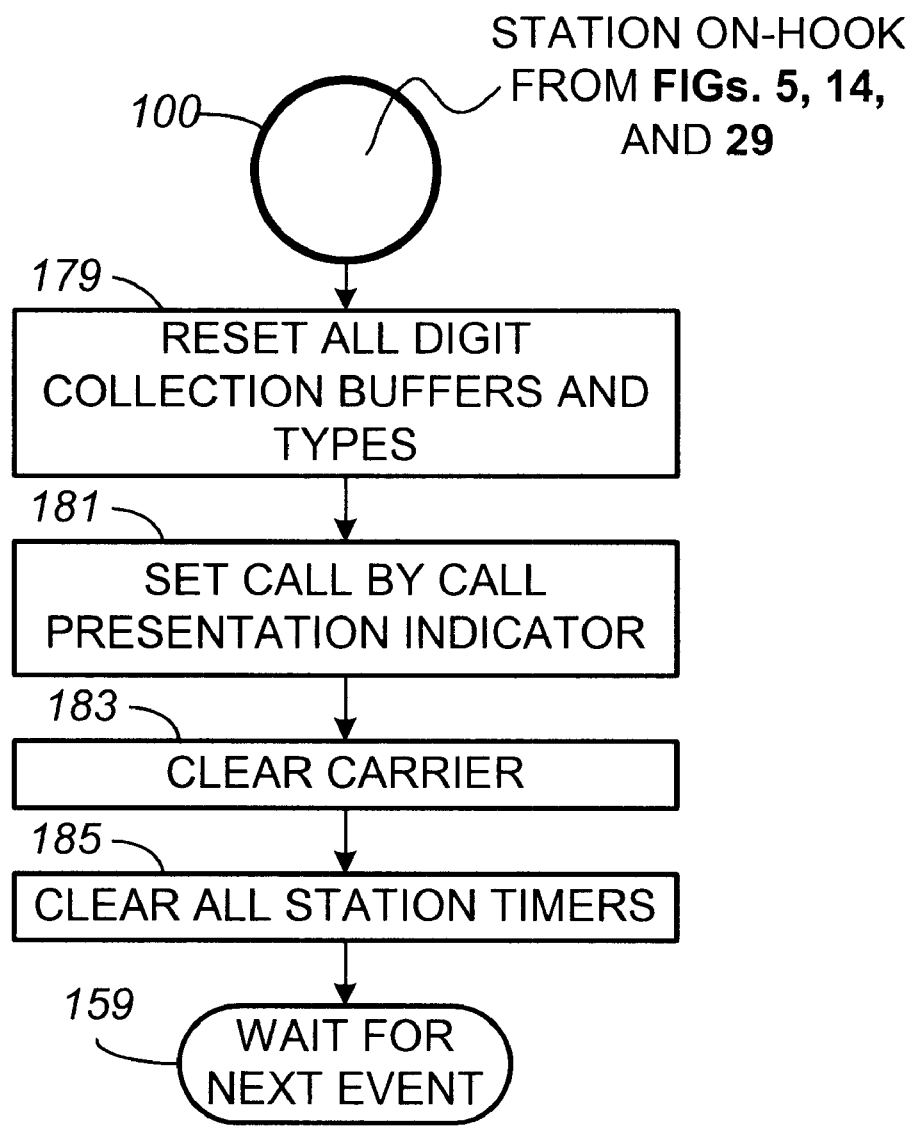
Figure 13:
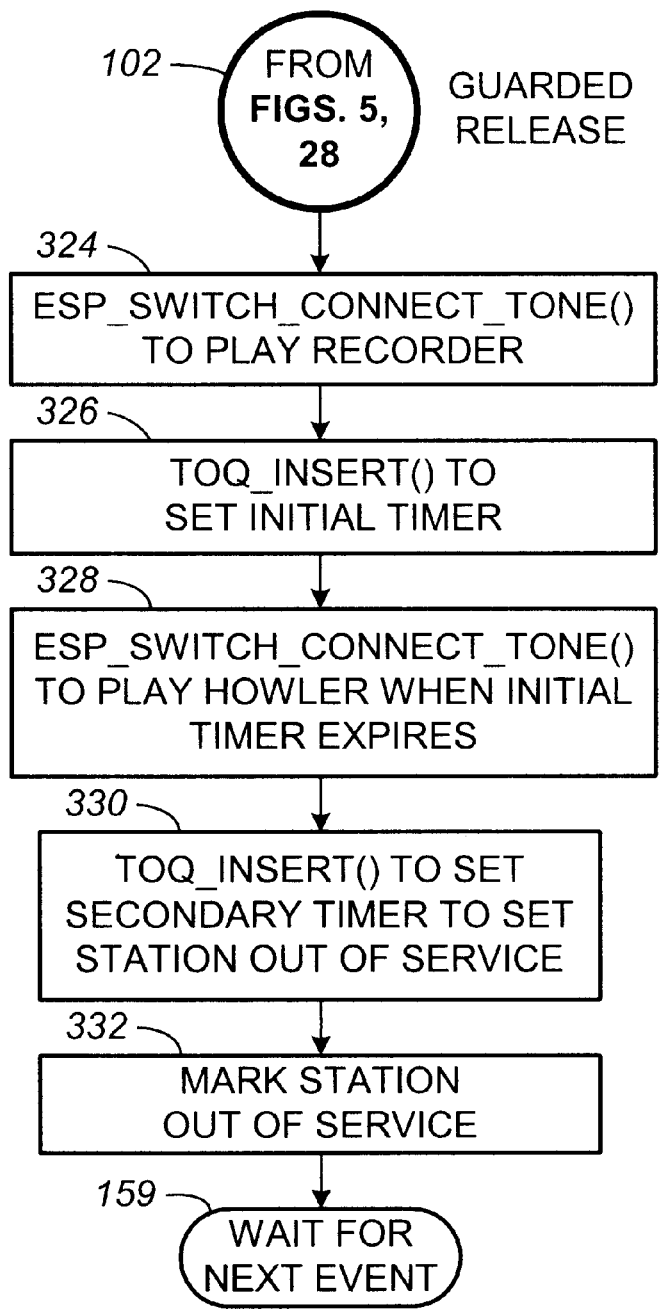
Figure 14:
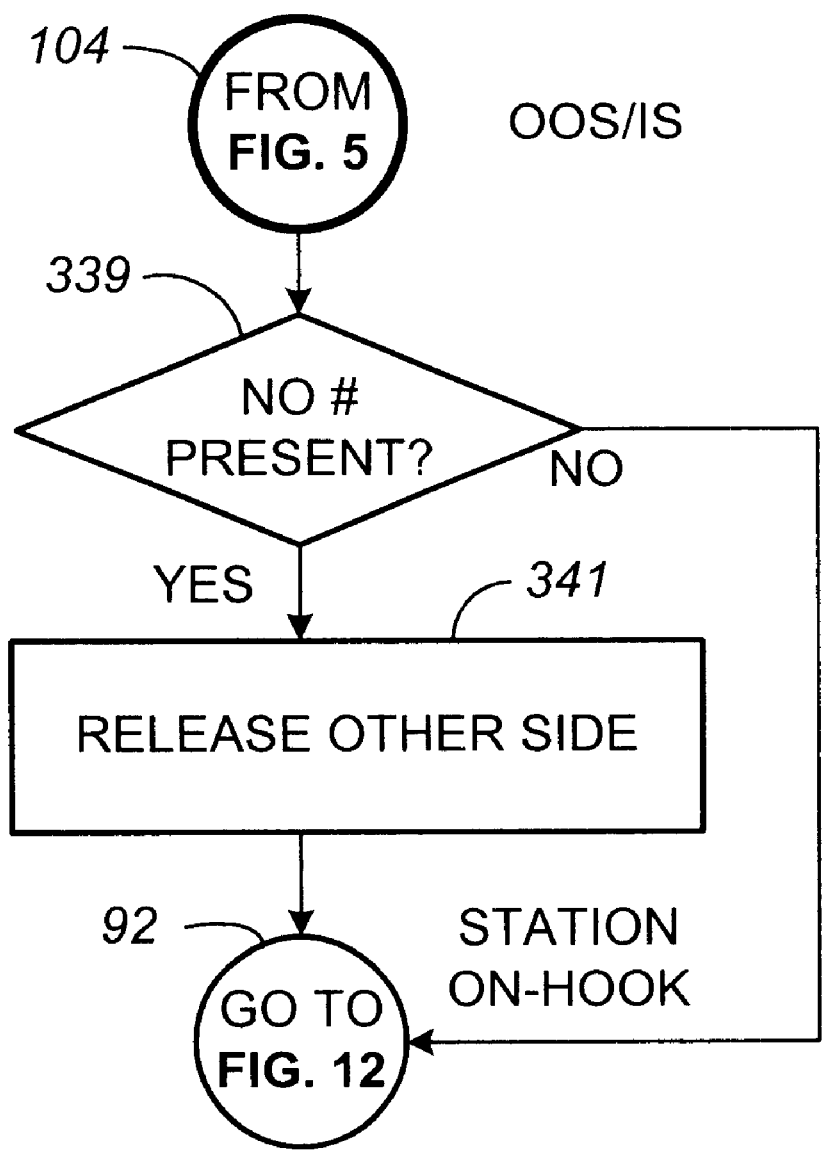

FIG. 5 is a flowchart illustrating the start of an outbound call, a first branch after a station validity check, and a branch on event. In this regard, inbound call processing begins at start step 80. After the start step 80, the logic 35 detects a call processing event for a station 82 defined on the digital matrix switch 2. Upon detecting the call-processing event, the logic 35 performs a station validity check in step 84. If the validity check fails, processing transfers to failure 86, which will be illustrated and described in association with FIG. 6. If the validity check returns an affirmative response, processing continues with branch on event step 88. In general, inbound call-processing branches to a specific portion of the flowchart upon detection of a particular event. More specifically, upon detection of an ESP_call_arrival event, processing transfers to the station off-hook 90 portion of the flowchart as shown in FIG. 7; upon detection of an ESP_digits_received event, processing transfers to the single digit report or timeout 92 portion of the flowchart as shown in FIG. 8; upon detection of the second ESP_digits_received event, processing transfers to the multiple digit report or timeout 94 portion of the flowchart as shown in FIG. 9; upon detection of an ESP_answer event, processing transfers to the answer 96 portion of the flowchart as shown in FIG. 10; upon detection of an ESP_flash_detected event, processing transfers to the attention 98 portion of the flowchart as shown in FIG. 11; upon detection of an ESP_released event, processing transfers to the station on-hook 100 portion of the flowchart as shown in FIG. 12; upon detection of an ESP_port_parked event, processing transfers to the guarded release 102 portion of the flowchart as shown in FIG. 13; upon detection of an ESP_port_OOS event, processing transfers to the OOS/IS 104 portion of the flowchart as illustrated in FIG. 14.

Figure 6:
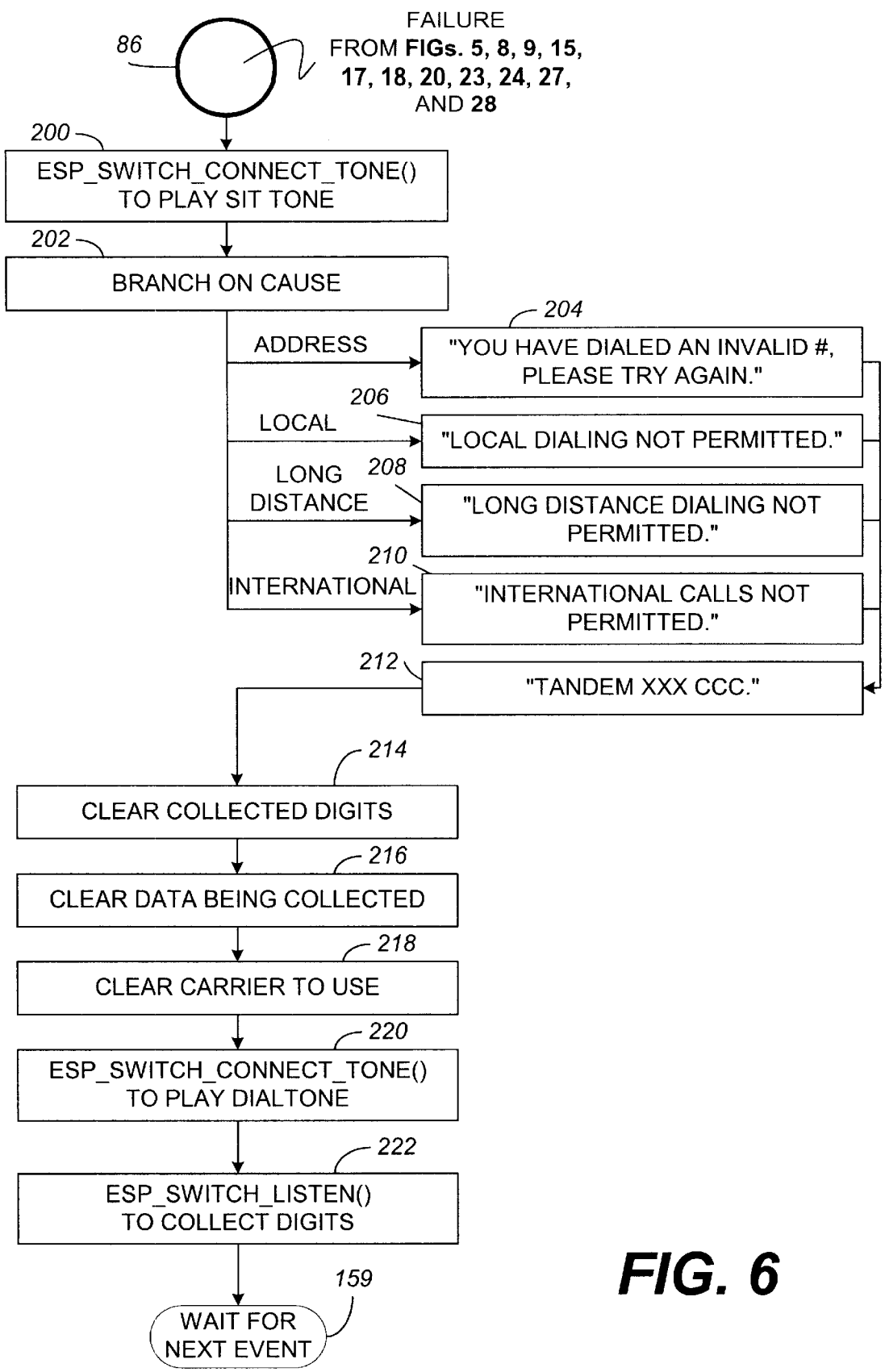

Having described that portion of outbound call processing illustrated in FIG. 5, reference is now directed to FIG. 6. In this regard, FIG. 6 is a flowchart illustrating outbound call processing upon a failure event. In this regard, failure event processing starts with step 86 (see FIGS. 5, 8, 9, 15, 17, 18, 20, 23, 24, 27, and 28).

First, the logic 35 instructs the ESP_switch_connect_tone to play the special intercept tone in step 200. Next, the logic 35 branches on cause as described below. If the failure was an address failure, the logic 35 transfers processing to step 204 where the caller encounters a taped message as follows, "You have dialed an invalid number, please try again." If the failure is a local failure, the logic 35 transfers processing to step 206 where the caller encounters a taped message as follows, "Local dialing not permitted." If the failure is a long distance failure, the logic transfers control to step 208 where the caller encounters a taped message as follows, "Long distance dialing not permitted." If the failure is an international failure, the logic 35 transfers processing control to step 210 where the caller encounters a taped message as follows, "International calls are not permitted." Next, the logic 35 performs step 212 where a signal is sent to clear the tandem transit network.

The logic 35 then performs step 214 to clear the collected digits, step 216 to clear the data being collected, step 218 to clear the carrier, step 220 to play a dial tone for the calling station, and step 222 to collect digits related to a new attempted call. Having performed steps 200 through 222, the logic 35 performs step 159 wait for next event.

Having described outbound call processing upon encountering a failure event as illustrated in FIG. 6, reference is now directed to FIG. 7. In this regard, FIG. 7 is a flowchart illustrating outbound call processing for a station off-hook event. Station off-hook event processing starts with step 90 (see FIG. 5). Next, the logic 35 sets the ESP_switch_collect_tone in step 193, sets the ESP_switch_listen in step 195, and sets the station to "in use" in step 197. Last, the logic 35 performs step 159 wait for next event.

Having described outbound call processing upon encountering a station off hook event as illustrated in FIG. 7, reference is now directed to FIG. 8. In this regard, FIG. 8 illustrates outbound call processing upon encountering a single digit report or a timeout. Having encountered a single digit report or timeout in step 92, the logic 35 adds to the collected digits buffer in step 101. Next, a query is performed to determine if the caller is operating in the dial by name mode in step 103. If yes, the logic 35 determines if the last digit was a timeout in step 105. If yes, the logic performs the name resolve portion of the flowchart as illustrated starting with step 107 (see FIG. 15). If the last digit was not a timeout, the logic 35 performs a wait for next event in step 159.

If the caller is not operating in dial by name mode as queried in step 103, the logic 35 performs the following string comparisons. If the caller enters "0" followed by a timeout as detected in step 111, the logic 35 transfers call processing flow to step 113 (see FIG. 16) operator. If the caller enters "01([2–9]" as detected in step 115, the logic 35 removes the leading "0" for the operator assisted call in step 117 and transfers flow to step 131 (see FIG. 17) get long distance number. If the caller enters a "011[.]{7,17} {T#}" as detected in step 121, the logic 35 transfers processing to step 123 (see FIG. 18) international number. If the caller enters "10" as detected in step 125, the logic 35 transfers processing to step 127 (see FIG. 19) get carrier. If the caller enters "1[2–9]" as detected in step 129, the logic 35 transfers processing to step 131 (see FIG. 17) get long distance number. If the caller enters "[2–9][2–9]" as detected in step 133 or alternatively, "[2–9]1[2–9]" as detected in step 135, the logic 35 transfers processing to step 137 (see FIG. 20) get local number. If the caller enters "[2–9]11" as detected in step 139, the logic 35 transfers processing to step 141 (see FIG. 21) N11 feature. If the caller enters "*[0–8][0–9]" as detected in step 143 or alternatively, "*9" as detected in step 145, the logic transfers processing to step 147 (see FIG. 22) supplementary features If the caller enters "[2–9]#" as detected in step 149 or alternatively "[2–4][0–9]#" as detected in step 151, the logic 35 transfers processing to step 153 (see FIG. 23) speed dial. If the caller has entered a string that does not have a possible match with the aforementioned string detection steps as described in relation to steps 111, 115, 121, 125, 129, 133, 135, 139, 143, 145, 149, or 151, processing continues with a query for a possible match in step 155. If no match is possible, the logic 35 transfers processing to step 157 (see FIG. 6) failure. Otherwise, if a partial string match exists, the logic 35 performs step 159 wait for next event.

Having described that portion of outbound call processing illustrated in FIG. 8, reference is now directed to FIG. 9. In this regard, FIG. 9 is a flowchart illustrating outbound call processing upon a multiple digit report or timeout. Having encountered a multiple digit report or timeout in step 94, the logic 35 first performs a timeout query in step 160. If a timeout is detected, the logic 35 transfers processing to step 86 (see FIG. 6) failure. Otherwise, the logic 35 adds digits to the collected digit buffer for the station in step 162. Next, the logic 35 branches on data being collected in step 164. If carrier data is collected in step 164, the logic 35 stores the carrier information in a state table in step 166. The logic 35, then performs step 168 where it clears the collected digits buffer and data collected. The logic 35 then performs step 159 wait for next event. If the logic detects destination data in step 164, the logic 35 performs step 170 where it validates the destination. Having validated the destination, the logic 35 checks to confirm that the station_dial_capabilities will permit the call in step 172. If no, the logic 35 transfers processing to step 86 (see FIG. 6) failure. If yes, the logic 35 routes the call by transferring control to step 174 (see FIG. 24).

Having described that portion of outbound call processing illustrated in FIG. 9, reference is now directed to FIG. 10. In this regard, FIG. 10 is a flowchart illustrating outbound call processing for an answer event. In this regard, answer event-processing starts with step 96 (see FIG. 5). The logic 35 sets the station mode to "in use" in step 199. Next, the logic 35 performs step 159 wait for next event.

Having described that portion of outbound call processing illustrated in FIG. 10, reference is now directed to FIG. 11. In this regard, FIG. 11 is a flowchart illustrating outbound call processing upon an attention event. Attention event processing starts at step 98 (see FIG. 5). Next, the logic 35 determines if the established outbound call is present in step 356. If the outbound call is present, the logic 35 determines if the conference feature is active for the station in step 358. If either of the queries in steps 356 or 358 is negative, the logic 35 responds by determining if the established call is present in step 360. If the established call is not present, the logic 35 performs step 159 wait for next event.

If the established call is present in step 360, the logic 35 determines if the waiting caller is present in step 362. If the waiting caller is present, the logic performs step 364 to park current calls. Next, the logic 35 performs step 366 to connect the waiting caller. Last, the logic performs step 159 wait for next event.

If the response to the query of step 358 is yes, the logic 35 responds by performing step 368 to create the conference call. Next, the logic 35 performs step 370 to connect the outbound leg to the conference. Then the logic 35 sets the conference-waiting bit for the station in step 372. Last, the logic 35 transfers processing to step 287 (see FIG. 25) disable call-waiting.

Having described that portion of outbound call processing illustrated in FIG. 11, reference is now directed to FIG. 12. In this regard, FIG. 12 is a flowchart illustrating outbound call processing upon encountering a station on-hook event. Station on-hook event processing starts with step 100 (see FIGS. 5, 14, and 29). Next, the logic 35 performs step 179 to reset all digit collection buffers and types. Having reset the digit collection buffers, step 181 is performed to set the call by call presentation indicator. Next, the logic clears the carrier in step 183 and clears all station timers in step 185. Last, the logic 35 performs step 159 wait for next event.

Having described that portion of outbound call processing illustrated in FIG. 12, reference is now directed to FIG. 13. In this regard, FIG. 13 is a flowchart illustrating outbound call processing upon a guarded release event. In this regard, guarded release event processing starts at step 102 (see FIGS. 5 and 28). Next, the logic 35 performs step 324 to play recorder. Then the logic 35 performs step 326 to initialize a timer, step 328 to play howler when the timer expires, step 330 to set a secondary timer to set the station out of service, and step 332 to mark the station out of service. Last, the logic 35 performs step 159 wait for next event.

Having described that portion of outbound call processing illustrated in FIG. 13, reference is now directed to FIG. 14. In this regard, FIG. 14 is a flowchart illustrating outbound call processing upon an out-of-service/in-service (OOS/IS) event. In this regard, OOS/IS event processing starts at step 104 (see FIG. 5). Next, the logic 35 performs a check to verify that no number is present in step 339. If no number is present, the logic 35 performs step 341 to release the other side of the switch. Next, or if a number was present upon performing the check in step 339, the logic 35 transfers processing to step 92 (see FIG. 12) station on-hook.

Figure 15:
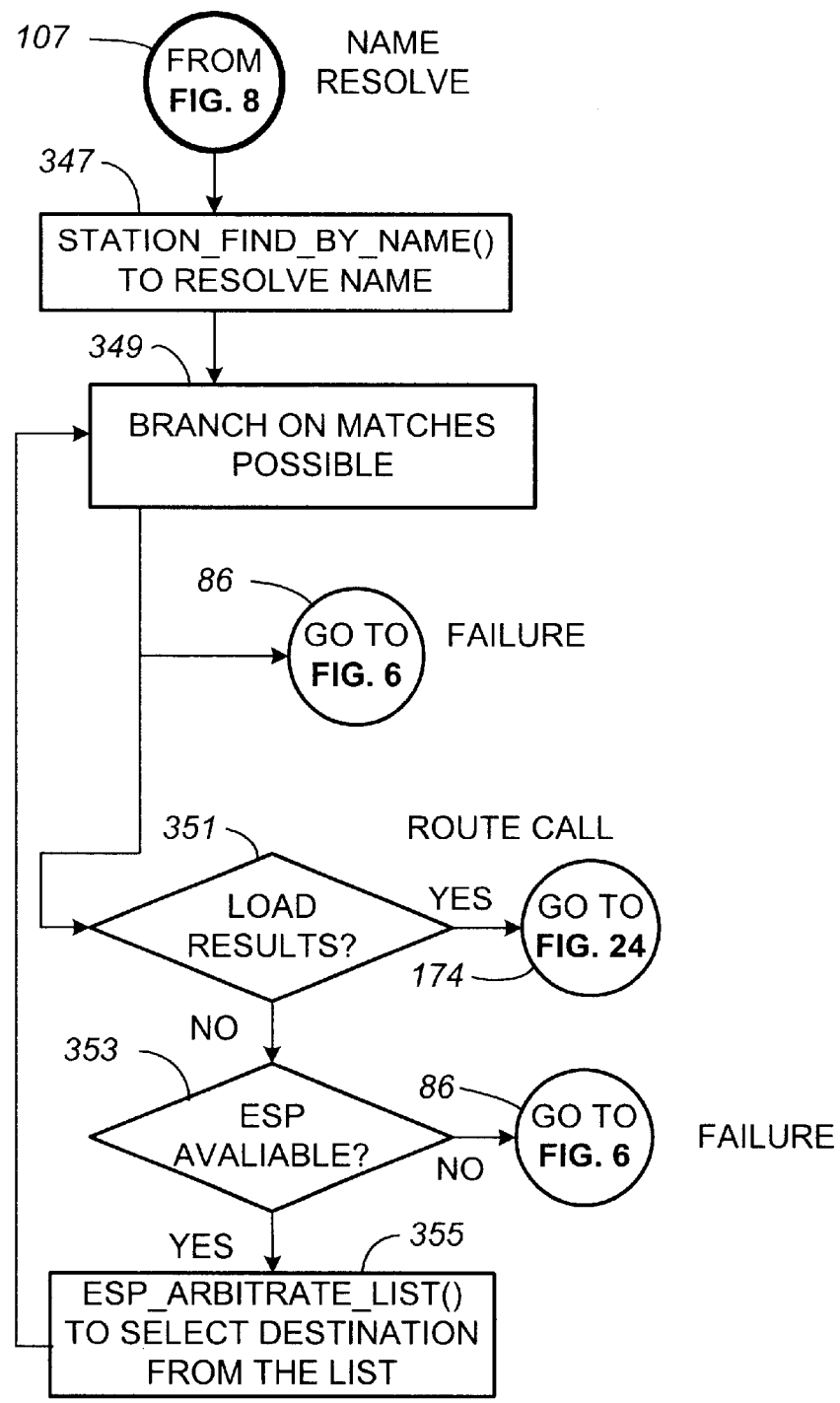

Having described that portion of outbound call processing illustrated in FIG. 14, reference is now directed to FIG. 15. In this regard, FIG. 15 is a flowchart illustrating outbound call processing upon a name resolve event. Name event processing starts at step 107 (see FIG. 8). Next, the logic 35 performs step 347 to resolve the name. Next, the logic performs step 349 to branch on matches possible. If no matches are possible, the logic transfers processing to step 86 (see FIG. 6) failure. If matches are possible, the logic 35 performs a load results query in step 351. If the response to the query is yes, then the logic 35 transfers processing to step 174 (see FIG. 24) route call. If no, the logic 35 determines if the ESP 20 is available in step 353. If the ESP 20 is not available, the logic 35 transfers processing to step 86 (see FIG. 6) failure. If the ESP 20 is available, the logic 35 performs step 355 to select the destination number from the list of available numbers by name for the station. The logic 35 then returns to step 349 where steps 86, 351, and 353 are repeated as appropriate until a failure is processed or a call is completed.

Figure 16:
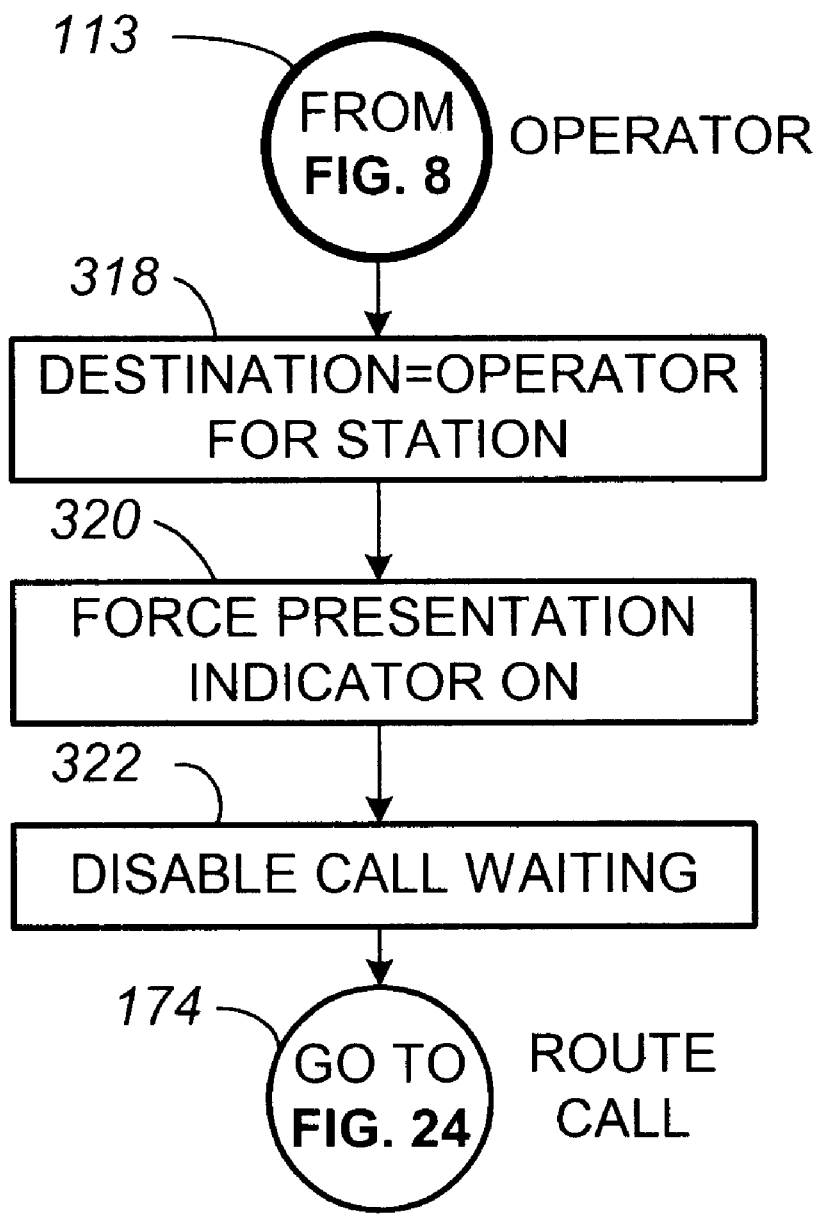

Having described that portion of outbound call processing illustrated in FIG. 15, reference is now directed to FIG. 16. In this regard, FIG. 16 is a flowchart illustrating outbound call processing upon an operator event. In this regard, operator event processing starts at step 113 (see FIG. 8). Next, the logic 35 performs step 318 where it sets the destination to the operator for the particular station. The logic 35 then performs step 320 where it sets the presentation indicator on. Next, the logic 35 disables call waiting in step 322. Last, the logic 35 performs step 174 (see FIG. 24) route call.

Figure 17:
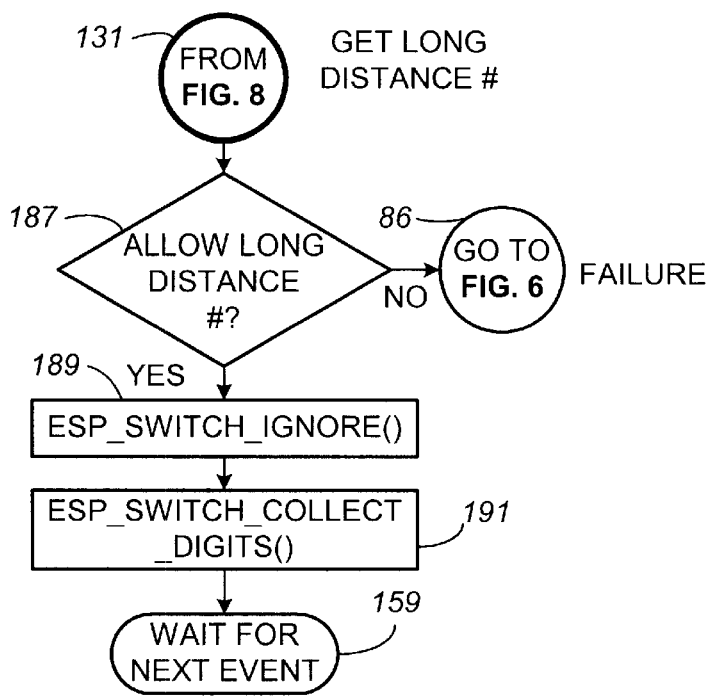

Having described that portion of outbound call processing illustrated in FIG. 16, reference is now directed to FIG. 17. In this regard, FIG. 17 is a flowchart illustrating outbound call processing for a get long distance number event. In this regard, get long distance number outbound call processing starts with step 131 (see FIG. 8). In this regard, the logic 35 determines whether long distance access is permitted for this station in step 187. If long distance access is not permitted, the logic 35 transfers processing to step 86 (see FIG. 6) failure. If long distance access is permitted, the logic 35 performs step 189 ESP_switch_ignore to ignore signals from the digital matrix switch 2 (see FIG. 1). Get long distance number processing continues with step 191 ESP_switch_collect_digits where the edge switch device is set to collect the individual digits of the long distance number. Last, the logic 35 performs step 159 wait for next event.

Figure 18:
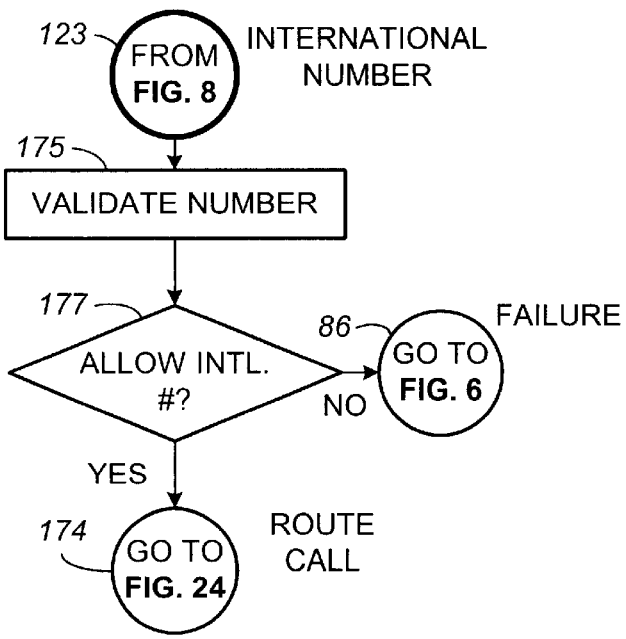

Having described that portion of outbound call processing illustrated in FIG. 17, reference is now directed to FIG. 18. In this regard, FIG. 18 is a flowchart illustrating outbound call processing for an international number. In this regard, international number outbound call processing starts with step 123 (see FIG. 8). Next, step 175 is performed to validate the number. Next, the logic 35 performs a query in step 177 to determine if international calls are permitted from the calling station. If international calls are not permitted, the logic 35 transfers processing to step 86 (see FIG. 6) failure. If international calls are permitted, the logic 35 transfers call processing to step 174 (see FIG. 24) route call.

Figure 19:
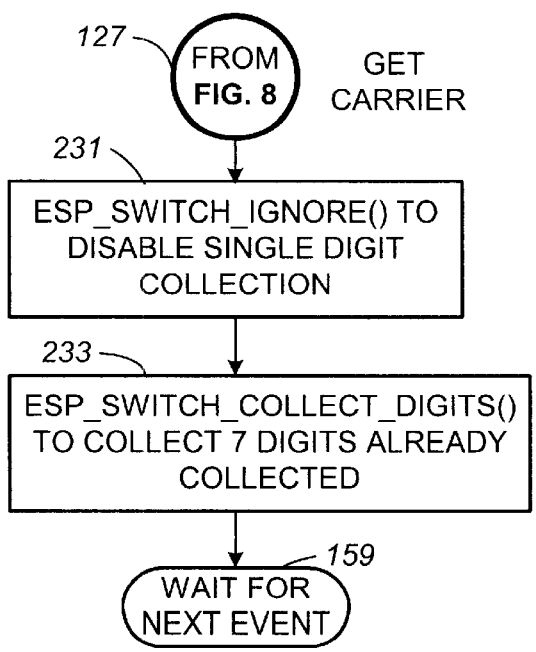

Having described that portion of outbound call processing illustrated in FIG. 18, reference is now directed to FIG. 19. In this regard, FIG. 19 is a flowchart illustrating outbound call processing upon a get carrier event. In this regard, get carrier event processing starts at step 127 (see FIG. 8). Next, the logic 35 performs step 231 to disable single digit detection. The logic 35 continues by performing step 233 to record the seven digits already collected. Last, the logic 35 performs step 159 wait for next event.

Figure 20:
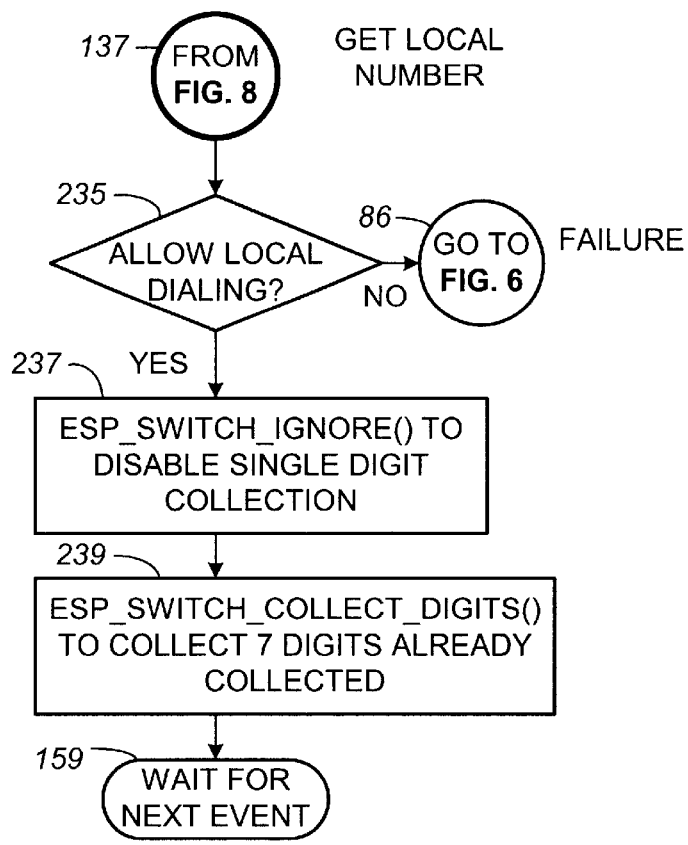

Having described that portion of outbound call processing illustrated in FIG. 19, reference is now directed to FIG. 20. In this regard, FIG. 20 is a flowchart illustrating outbound call processing upon a get local number event. Get local number event processing starts with step 137 (see FIG. 8). In this regard, the logic 35 proceeds by performing a query whether to permit local dialing in step 235. If local dialing is not permitted, the logic 35 transfers processing to step 86 (see FIG. 6) failure. If local dialing is permitted, the logic 35 performs step 237 to disable single digit detection. Next, the logic 35 performs step 239 to collect seven digits from the buffer. Last, the logic 35 performs step 159 wait for next event.

Figure 21:
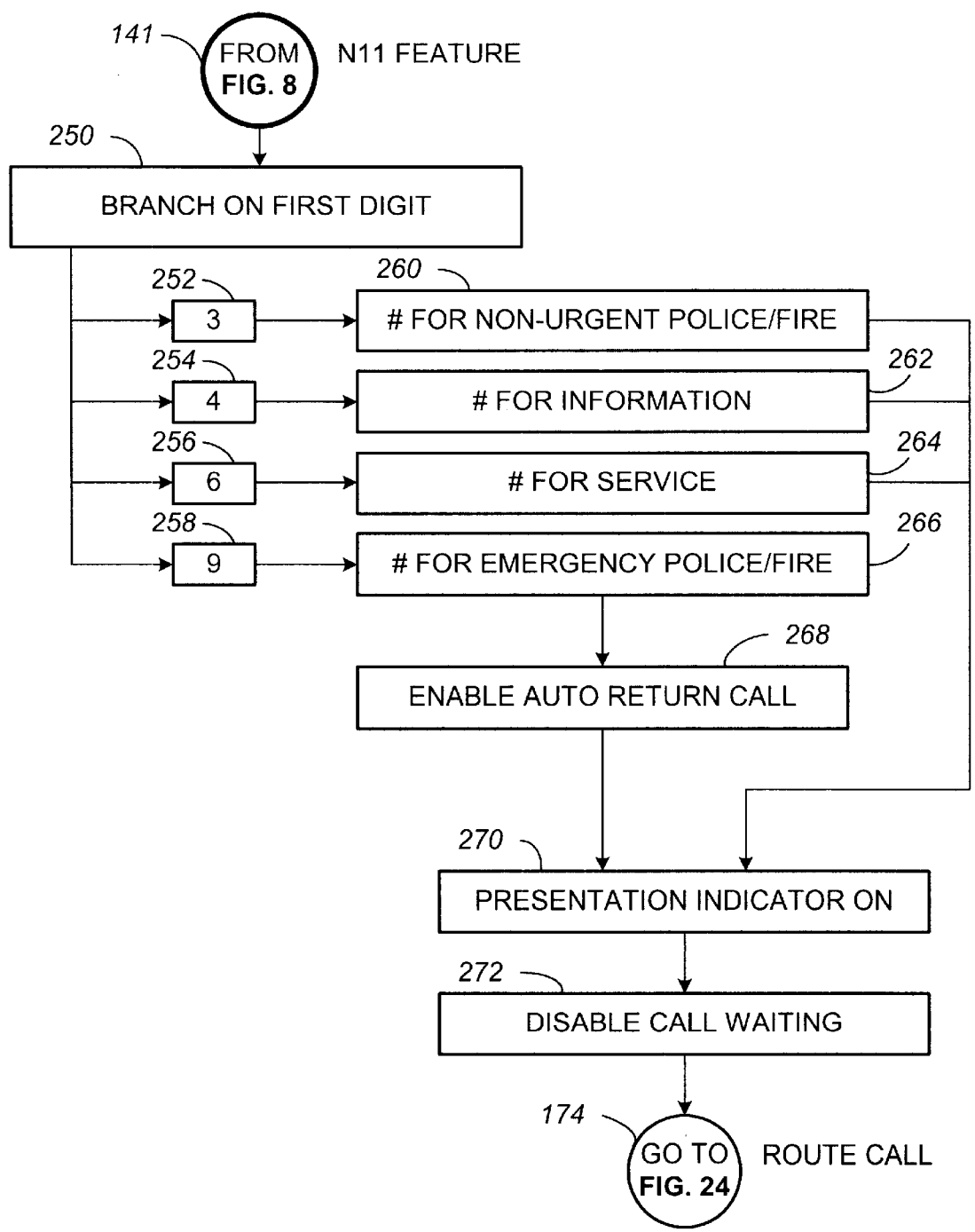

Having described that portion of outbound call processing illustrated in FIG. 20, reference is now directed to FIG. 21. In this regard, FIG. 21 is a flowchart illustrating outbound call processing upon a N11 dial string. N11 event processing starts at step 141 (see FIG. 8). Upon determining that the caller has selected a "N11" feature, the logic 35 performs step 250 branch on the first digit. If the first digit is a "3," as detected in step 252, the logic transfers processing to step 260 where the caller is connected to the non-urgent police/fire number for that caller's switch. If the first digit is a "4," as detected in step 254, the logic 35 transfers processing to step 262 where the caller is connected to the information number for that caller's switch. If the first digit is a "6," as detected in step 256, the logic 35 transfers processing to step 264 where the caller is connected to the service provider's service line. If the first digit is a "9," as detected in step 258, the logic 35 transfers processing to step 266 where the caller is connected to the local police/fire emergency number for that caller's switch. Next, the logic 35 performs step 268 to enable the emergency police/fire operator to auto return should the caller hang-up. Having completed calls via steps 260, 262, 264 or step 268 after an emergency call; the logic 35 sets the presentation indicator on in step 270. Next, the logic 35 performs step 272 where it disables call waiting. Last, processing is transferred to step 174 (see FIG. 24) route call.

Figure 22:
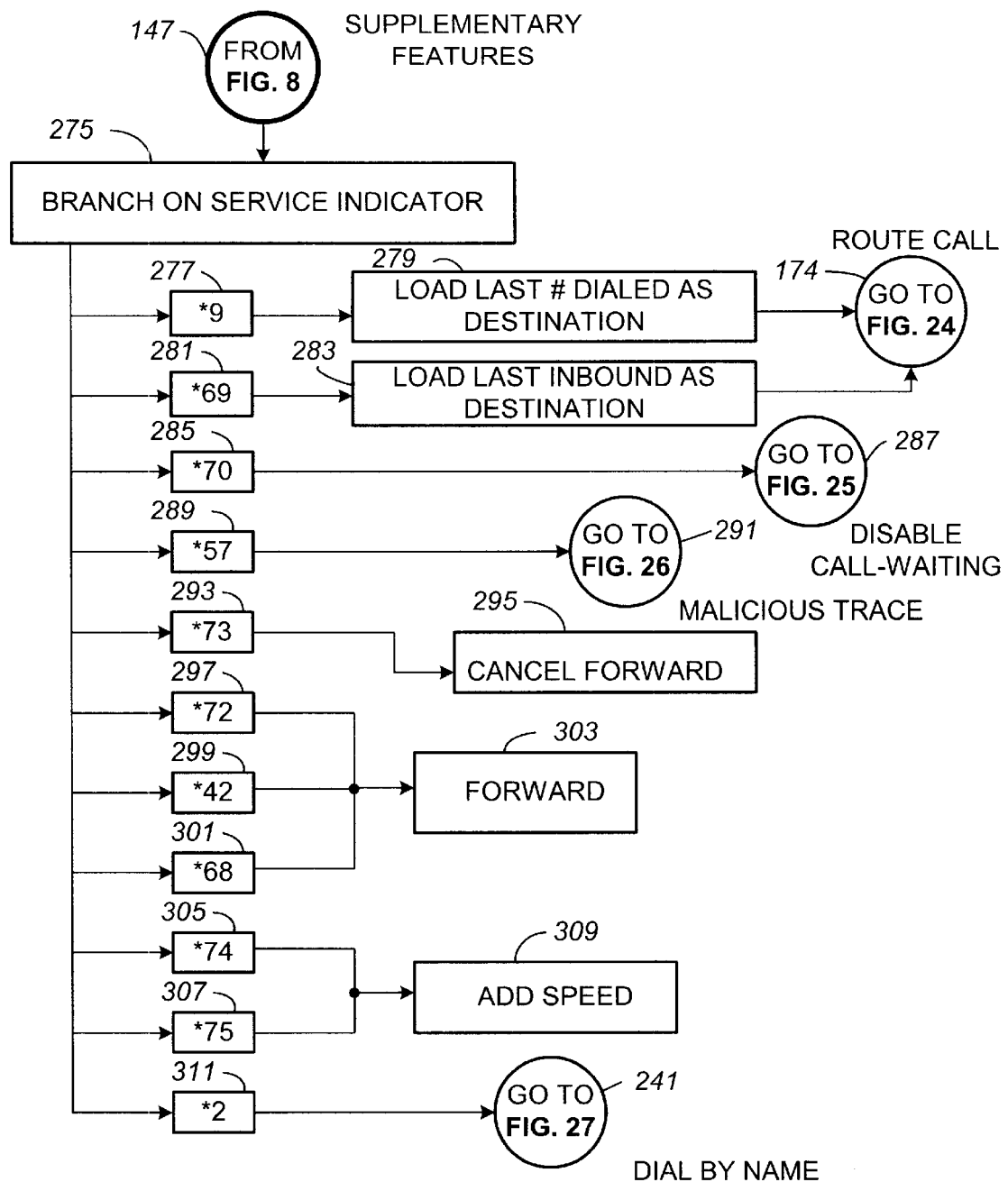

Having described that portion of outbound call processing illustrated in FIG. 21, reference is now directed to FIG. 22. In this regard, FIG. 22 is a flowchart illustrating outbound call processing upon a supplementary features event. Having detected a generic feature event request in step 147, the logic 35 proceeds by branching on service indicator in step 275. Upon detecting that the caller has dialed "*9" in step 277, the logic 35 performs step 279 where it loads the last number dialed. The logic 35 then transfers control to step 174 (see FIG. 24) Route call. Upon detecting that the caller has dialed "*69" in step 281, the logic performs step 283 where it loads the last inbound number as the destination number. The logic 35 then transfers processing to step 174 (see FIG. 24) route call. Upon detecting that the caller has dialed "*70" in step 285, the logic 35 transfers processing to step 287 (see FIG. 25) disable call-waiting. Upon detecting that the caller has dialed "*57" in step 289, the logic 35 transfers processing to step 291 (see FIG. 26) malicious trace. Upon detecting that the caller has dialed "*73" in step 293, the logic 35 cancels call forwarding in step 295. Upon detecting that the caller has dialed either "*72," "*42," or "*68," (steps 297, 299, 301) the logic 35 forwards that call in step 303. Upon detecting that the caller has dialed either "*74" or "*75" in steps 305 and 307, the logic 35 adds speed calling in step 309. Upon detecting that the caller has dialed a "*2" in step 311, the logic 35 transfers control to step 241 (see FIG. 27) dial by name.

Figure 23:
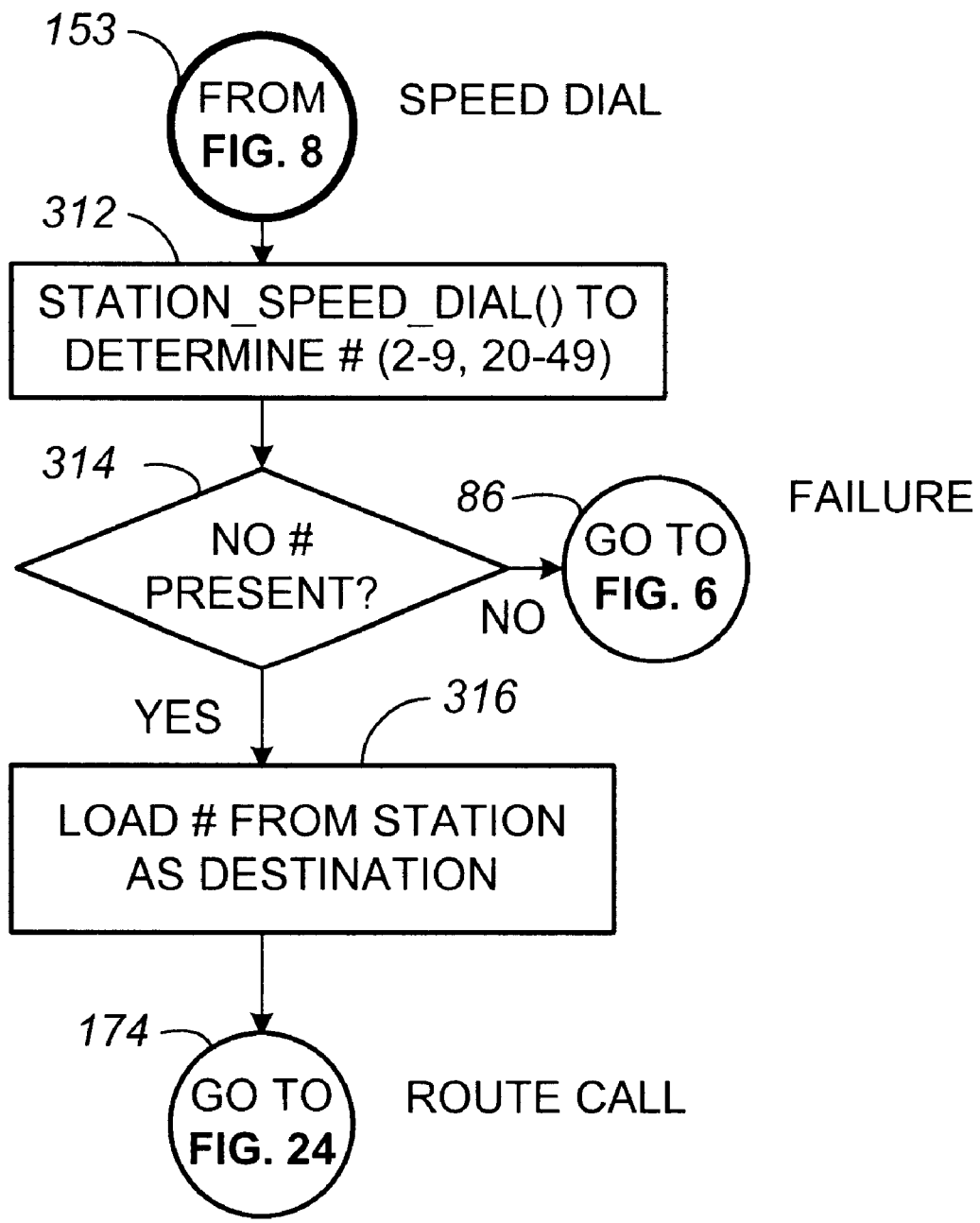

Having described that portion of outbound call processing illustrated in FIG. 22, reference is now directed to FIG. 23. In this regard, FIG. 23 is a flowchart illustrating outbound call processing upon a speed dial event. In this regard, speed dial event processing starts at step 153 (see FIG. 8). Having determined that the caller wishes to process a call with speed dialing, the logic 35 performs step 312 to determine which number to dial. Next, in step 314, the logic 35 performs a check to verify that the speed dial buffer location has a number stored in the buffer. If no number is found in the buffer, the logic 35 transfers processing to step 86 (see FIG. 6) failure. If a number is found in the speed dial buffer location, the logic 35 performs step 316 where it loads the destination number. Last, the logic 35 routes the call by transferring processing to step 174 (sec FIG. 24) route call.

Figure 24:
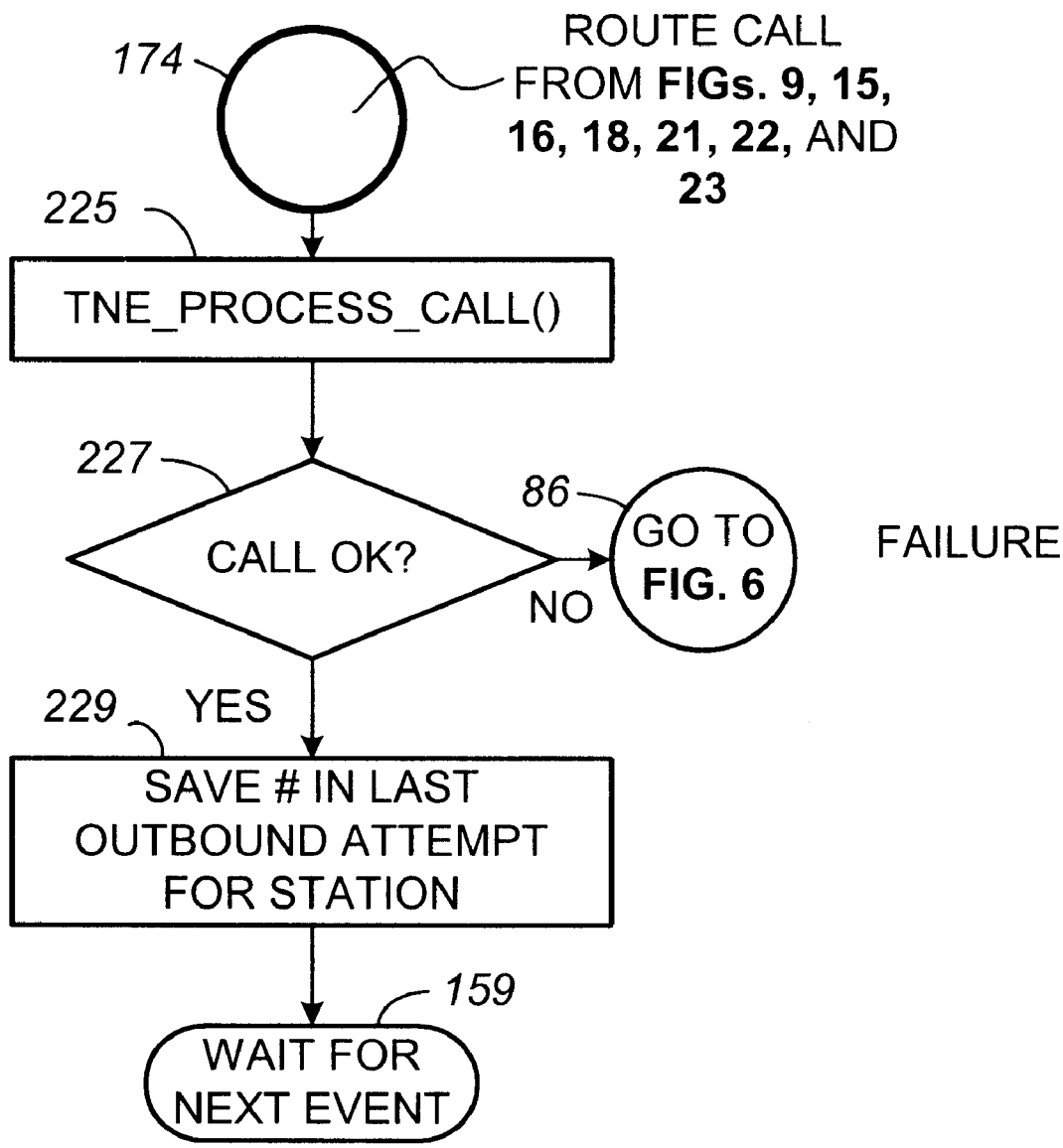

Having described that portion of outbound call processing illustrated in FIG. 23, reference is now directed to FIG. 24. In this regard, FIG. 24 is a flowchart illustrating outbound call processing upon a route call event. Route call outbound call-processing starts with step 174 (sec FIGS. 9, 15, 16, 18, 21, 22, and 23). The logic 35 routes the outbound call by performing step 225 TNE_process_call where the dialed number is transferred to the tandem transit switch 10 (see FIG. 1). Next in step 227, the logic 35 performs a check to ensure that the call is successfully connected. If the call is not properly connected, the logic transfers processing to step 86 (see FIG. 6) failure. If the call is properly connected, the logic 35 performs step 229 to save the dialed number in the last outbound attempt buffer for the station. The logic 35 then performs step 159 wait for next event.

Figure 25:
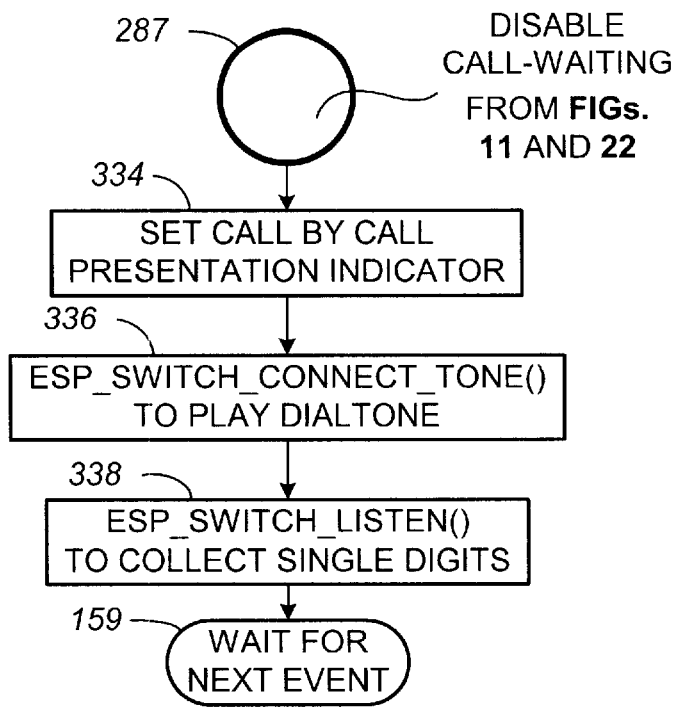

Having described that portion of outbound call processing illustrated in FIG. 24, reference is now directed to FIG. 25. In this regard, FIG. 25 is a flowchart illustrating outbound call processing upon a disable call-waiting event. In this regard, disable call-waiting event processing starts at step 287 (see FIGS. 11 and 22). Next, the logic 35 performs step 334 to set the call by call presentation indicator, step 336 to play a dial tone, and step 338 to collect single digits. Last, the logic 35 performs step 159 wait for next event.

Figure 26:
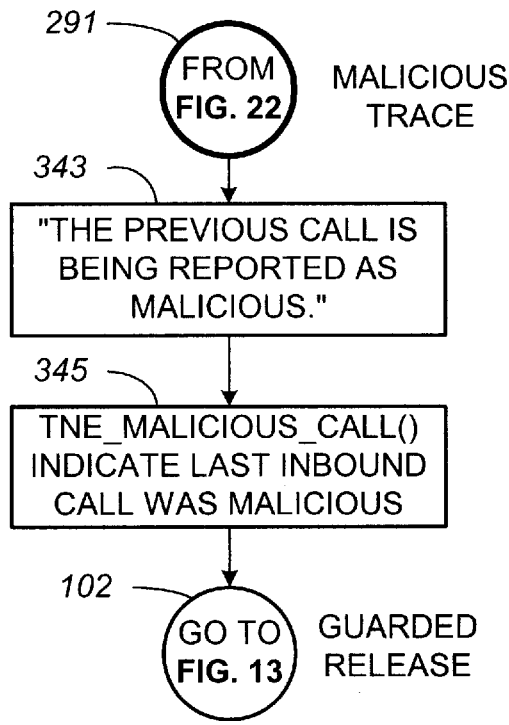

Having described that portion of outbound call processing illustrated in FIG. 25, reference is now directed to FIG. 26. In this regard, FIG. 26 is a flowchart illustrating outbound call processing upon a malicious trace event. In this regard, malicious trace event processing starts at step 291 (see FIG. 22). Next, the logic 35 performs step 343 to play a recording as follows, "The previous call is being reported as malicious." Then, the logic 35 performs step 345 to mark the last inbound call as "malicious." Last, the logic 35 transfers processing to step 102 (see FIG. 13) guarded release.

Figure 27:
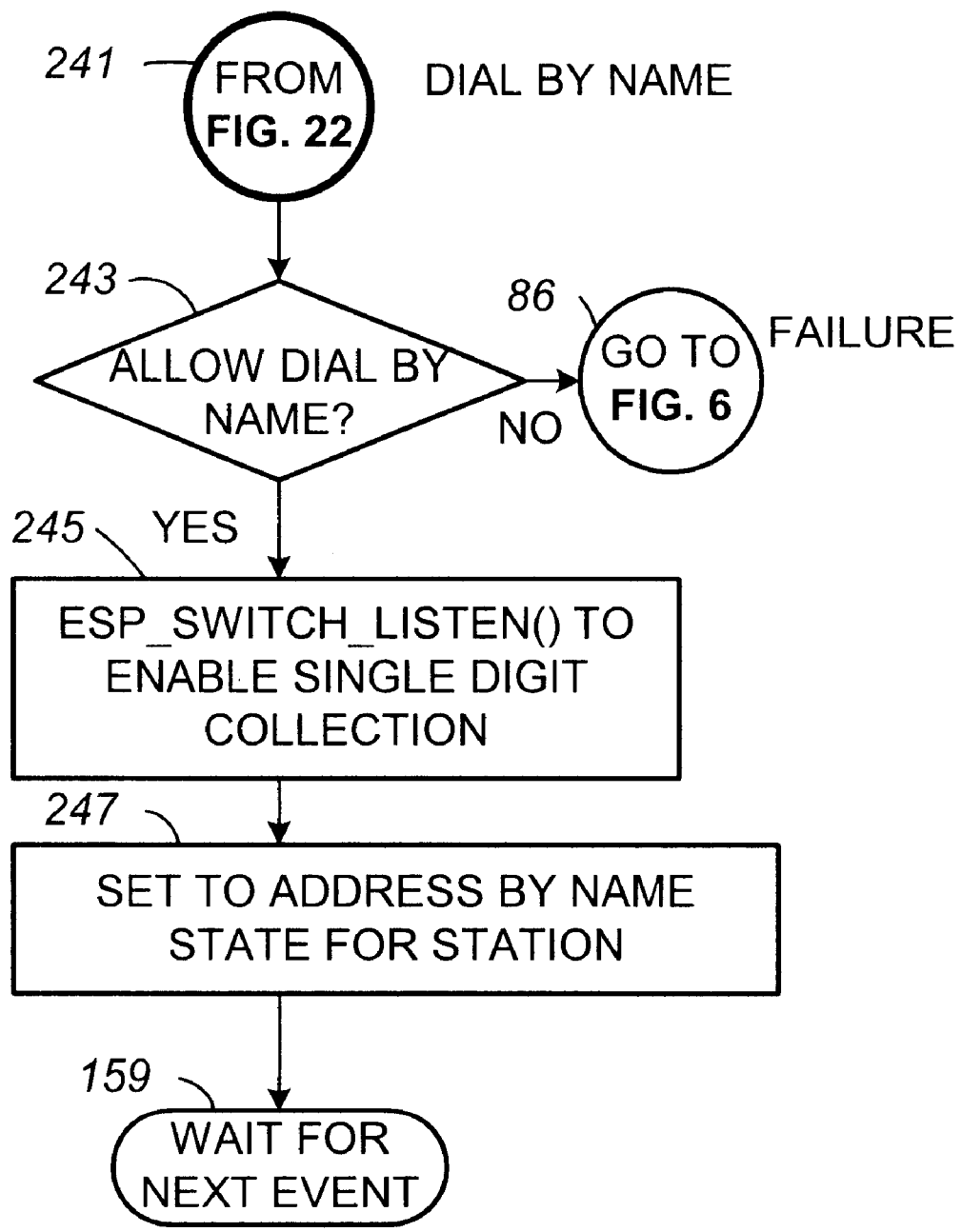

Having described that portion of outbound call processing illustrated in FIG. 26, reference is now directed to FIG. 27.

In this regard, FIG. 27 is a flowchart illustrating outbound call processing upon a dial by name event. In this regard, dial by name event processing starts at step 241 (see FIG. 22). First, the logic 35 determines if the dial by name mode is available to the station in step 243. If the dial by name mode is not available, the logic 35 transfers processing to step 86 (see FIG. 6) failure. If the station is permitted to dial by name, the logic 35 performs step 245 to enable single digit detection. Next, the logic 35 performs step 247 set to address by name for the station. Last, the logic 35 performs step 159 wait for next event.

B. INBOUND CALLS

Calls originating from a remote transit network may have the following independent event processing logic performed by the logic 35. The flow charts of FIGS. 28–31 show the architecture, functionality, and operation of a possible implementation of a portion of the logic 35. In this regard, each block represents a module, segment, or portion of code, which comprises one or more executable instructions for implementing the specified logical function(s). It should also be noted that in some alternative implementations, the functions noted in the blocks might occur out of the order noted. For example, two blocks shown in succession may in fact be executed substantially concurrently or the blocks may sometimes be executed in the reverse order, depending upon the functionality involved. In this regard, FIGS. 28–31 illustrate the processing logic as applied to inbound calls.

Figure 28:
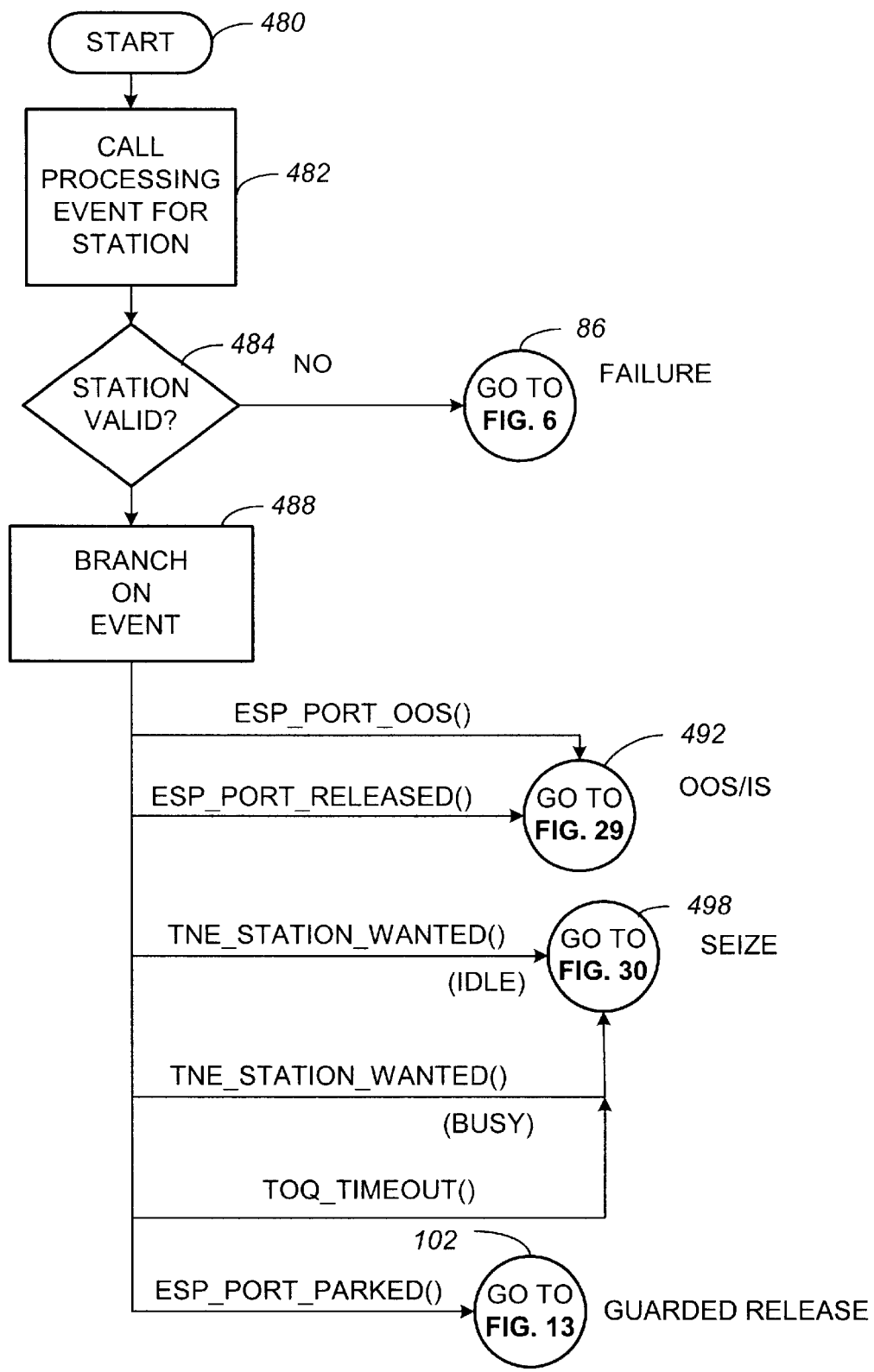
FIGS. 28–30 present portions of a flowchart illustrating station inbound call event processing as described below.

FIG. 28 is a flowchart illustrating the start of an inbound call, a first branch after a station validity check, and a branch on event. In this regard, inbound call processing begins at start step 480. After the start step 480, the logic 35 detects a call processing event for a station 482 defined on the digital matrix switch 2. Upon detecting the call-processing event, the logic 35 performs a station validity check in step 484. If the validity check fails, processing transfers to step 86 failure as previously illustrated and described in association with FIG. 6. If the validity check returns an affirmative response, processing continues with branch on event step 488. In general, inbound call-processing branches to a specific portion of the flowchart upon detection of a particular event. More specifically, upon detection of an _ESP_port_OOS event, processing transfers to the OOS/IS 492 portion of the flowchart as shown in FIG. 29; upon detection of an ESP_port_released event, processing transfers to the OOS/IS 492 portion of the flowchart as shown in FIG. 29; upon detection of an TNE_station wanted (idle) event, processing transfers to the seize 498 portion of the flowchart as shown in FIG. 30; upon detection of a TNE_ station_wanted (busy) event, processing transfers to the seize 498 portion of the flowchart as shown in FIG. 30; upon detection of a TOQ_timeout event, processing transfers to the seize 498 portion of the flowchart as shown in FIG. 30; upon detection of an ESP_port_parked event, processing transfers to the guarded release 102 portion of the flowchart as shown in FIG. 13.

Figure 29:
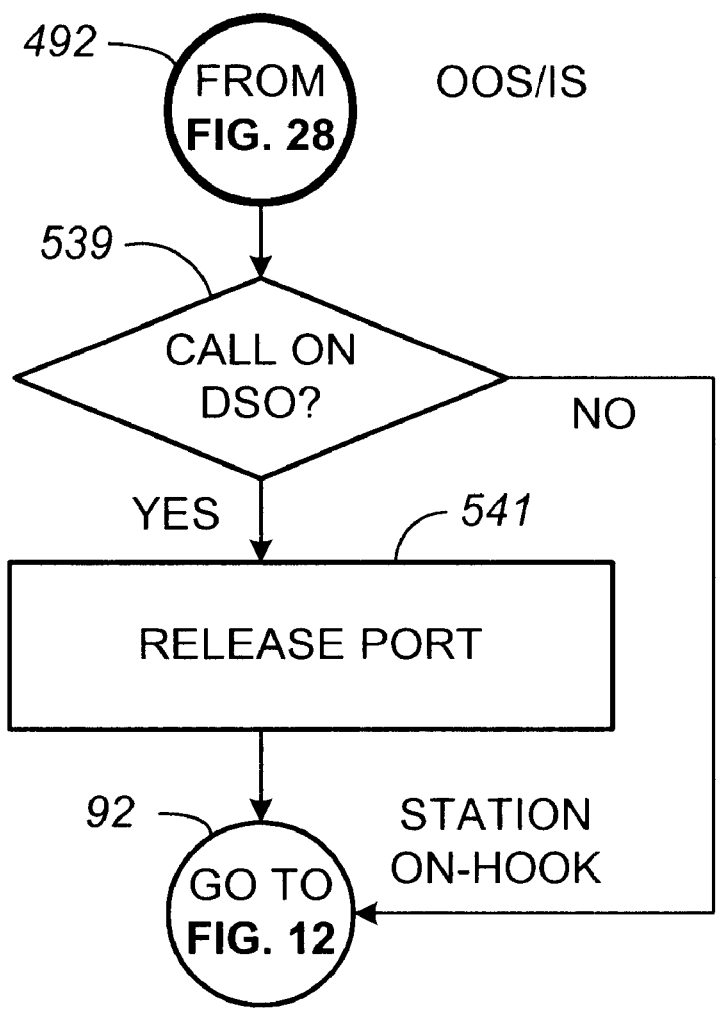

Having described that portion of inbound call processing illustrated in FIG. 28, reference is now directed to FIG. 29. In this regard, FIG. 29 is a flowchart illustrating inbound call processing upon an OOS/IS event. Having transferred processing from step 492 (see FIG. 28), the logic 35 performs a check to see if the call is presently being serviced in 539. If yes, the logic releases the port in step 541 before performing the station on-hook portion of the flowchart starting with step 92 (see FIG. 12). If the response to the query in step 539 is negative, the logic 35 simply transitions to step 92 (see FIG. 12) station on-hook.

Figure 30:
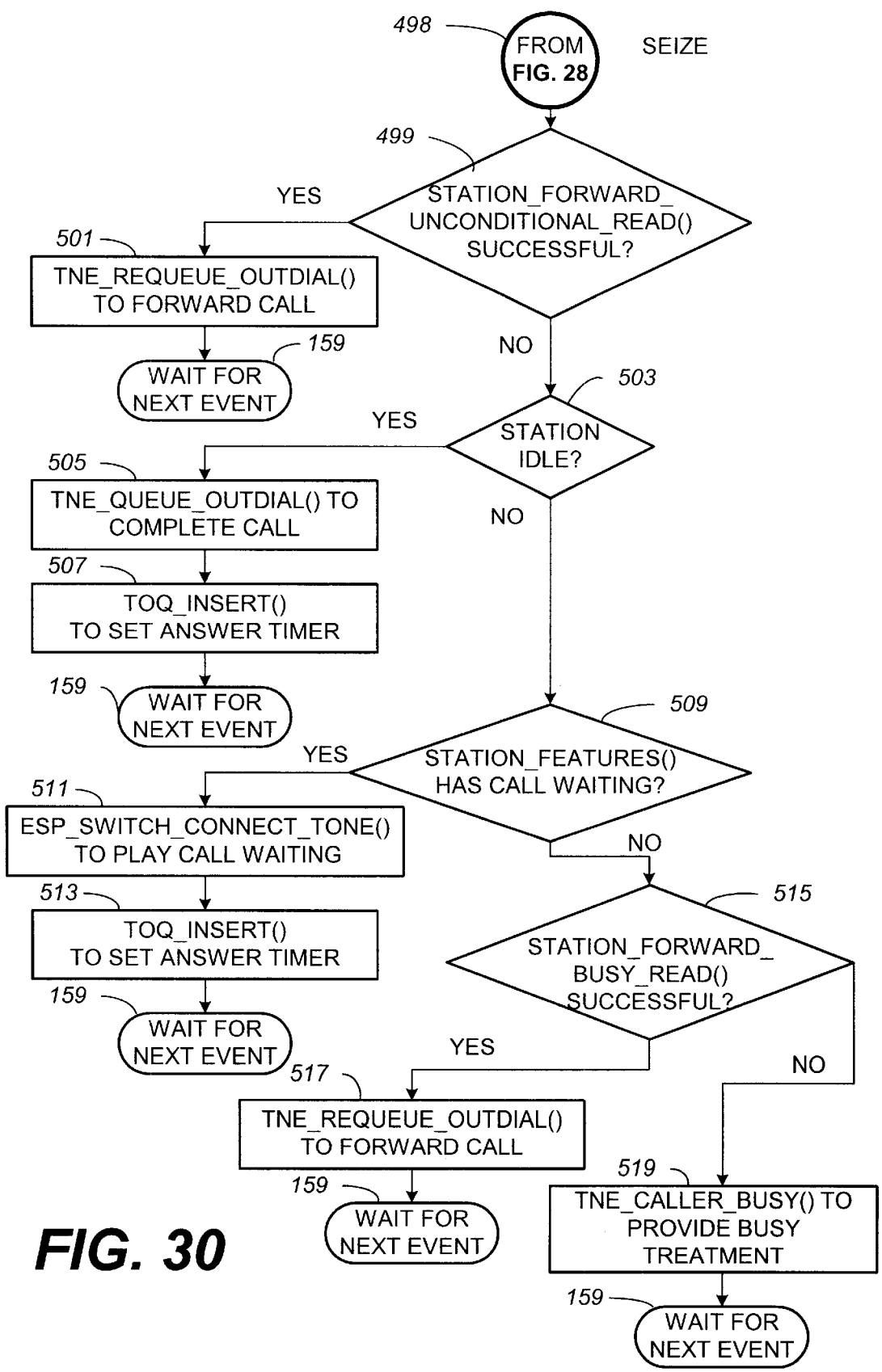

Having described that portion of inbound call processing illustrated in FIG. 29, reference is now directed to FIG. 30.

In this regard, FIG. 30 is a flowchart illustrating inbound call processing upon a seize event. Seize event processing starts at step 498 as previously described with FIG. 28. Having entered this portion of the flowchart, the logic 35 performs a station_forward_unconditional_read validity check in step 499. If step 499 is successful, the logic 35 executes a TNE_requeue_outdial in step 501 to forward the call. After forwarding the call, the logic 35 executes a wait for next event in step 159. If step 499 is unsuccessful, the logic 35 performs a station idle check in step 503. If step 503 is successful, the logic 35 executes a TNE_queue_outdial in step 505 to complete the call. Having executed step 505, the logic 35, then executes a TOQ_insert in step 507 to set an answer timer. After setting the answer timer, the logic 35 executes a wait for next event in step 159. If step 503 is unsuccessful, the logic 35 checks the station features in step 509 to determine if the station is conFIG.d for call waiting. If step 509 is successful, the logic 35 executes an ESP_switch_connect_tone in step 511 to notify the user that a call is waiting. Next, the logic 35 executes a TOQ_insert in step 513 to set an answer timer. After setting the answer timer, the logic 35 executes a wait for next event in step 159. If step 509 is unsuccessful, the logic 35 performs a station_forward_busy_read check in step 515. If step 515 is successful, the logic 35 executes a TNE_requeue_outdial in step 517 to forward the call. The logic 35 then executes a wait for next event in step 159. If step 515 is unsuccessful, the logic 35 executes a TNE_caller_busy in step 519 to provide busy treatment to the inbound caller. After executing step 519, the logic 35 then executes a wait for next event in step 159.

Having described that portion of inbound call processing illustrated in FIG. 30, reference is now directed to FIG. 31. In this regard, FIG. 31 is a flowchart illustrating inbound call processing upon a ring no answer (RNA) event. Upon detecting a RNA event, the logic 35 performs a station being seized and unanswered check in step 520. Upon encountering a station seizure with no answer, the logic 35 performs a TNE_release_port event in step 522. Next, all other responses from the station seizure and no answer query of step 520 and after step 522, the logic 35 proceeds with a station_forward_no_answer_read in step 524. If the station_forward_no_answer_read is unsuccessful, the logic 35 responds with a wait for next event in step 159. Otherwise, the logic 35 performs a TNE_requeue_outdial to forward the call in step 526. After forwarding the call in step 526, the logic performs a wait for next event in step 159.

Having described that portion of inbound call processing illustrated in FIG. 30, reference is now directed to FIG. 31. In this regard, FIG. 31 is a flowchart illustrating inbound call processing upon This completes the description of in-bound call processing illustrated in FIGS. 28 through 31.

V. ANTICIPATED VARIATIONS AND MODIFICATIONS

It should be emphasized that the above-described embodiments of the present invention, particularly, any "preferred" embodiments, are merely possible examples of implementations, merely set forth for the benefit of the reader for clearly disclosing to the reader the basic principles of the invention. Many variations and modifications may be made to the above-described embodiment(s) of the invention without departing substantially from the spirit and principles of the invention, and such variations and modifications have not been described herein for brevity sake and simplicity. All such variations and modifications are intended to be included herein within the scope of this disclosure and the present invention and are intended to be protected by the following claims.

Now, therefore, at least the following is claimed:

1. A system, comprising:
   a plurality of stations communicating signals pursuant to at least one signaling standard;
   a routing network;
   a switch capable of connecting one of said stations with said routing network;
   a service management point; and
   an edge switch device integrated with said switch for controlling said switch to select said one station, said edge switch device capable of supporting telecommunications features distributed via logic to said edge switch device from said service management point.

2. The system of claim 1, wherein said stations are part of a telephonic communications network.

3. The system of claim 1, wherein said at least one signaling standard enables telephonic equipment to communicate with said switch.

4. The system of claim 3, wherein said at least one signaling standard is selected from the group consisting of foreign exchange station (FXS) loopstart, GR-303, and H.323.

5. The system of claim 1 wherein said switch is further integrated with an interface configured to communicate signals, the interface capable of communications under at least one signaling standard.

6. The system of claim 5, wherein said at least one signaling standard is selected from the group consisting of voice over the Internet protocol (VoIP), media gateway control protocol (MGCP), and H.323.

7. The system of claim 1, further comprising:
   a service control point wherein user information is stored.

8. The system of claim 7, wherein said user information comprises identification information, the user information further comprising features enabled by the edge switch device, wherein the features are user selectable.

9. The system of claim 8, wherein said service control point is capable of storing both static and dynamic user data.

10. The system of claim 9, further comprising:
    an edge switch point, wherein said edge switching point is in communication with said service management point and said service control point to receive logic that enables user specific features, the user specific features enabled by logic responsive to an input.

11. The system of claim 10, wherein said input is a user request.

12. The system of claim 11, wherein said user request is entered via the group consisting of voice, a DTMF tone, an off-hook signal, and a flash signal.

13. The system of claim 10, wherein said service management point, said service control point, and said edge switching point are in communication via a network.

14. The system of claim 13, wherein said network is configured to support communications using transfer control protocol/Internet protocol (TCP/IP).

15. The system of claim 13, wherein said network is configured to support communications using signaling system no. 7 (SS7).

16. The system of claim 13, wherein a portion of the logic stored within the edge switching point is updated with logic stored in the service management point.

17. The system of claim 16, wherein logic replacement in the edge switching point is responsive to a determination that there is a difference between the logic stored therein and the logic stored in the service management point.

18. The system of claim 17, wherein the determination is made by the edge switching point.

19. The system of claim 17, wherein the determination is made by the service management point.

20. A method for enabling features at a plurality of stations, each station in communication with an EO switch, comprising:

inserting a programmable network edge switching device between a switching circuit and a transit network;

applying logic configured to provide select features to said programmable network edge switch device;

intercepting edge switching events;

applying said logic to the intercepted edge switching events and user information;

generating switching primitives; and using the switching primitives to establish calls on a transit network.

21. The method of claim 20, wherein said logic is generated in a language selected from the group consisting of Java, Java Script, PERL, and Python.

22. The method of claim 20, further comprising:

adding voice-processing circuits configured to provide voice recognition and voice response functionality to select users.

23. The method of claim 20, wherein the inserted programmable network edge switching device is configured to interface with switches capable of switching calls using a signaling standard selected from the group consisting of voice over the Internet protocol (VoIP), media gateway control protocol (MGCP), and H.323.

24. A method for enabling class 5 features at a plurality of stations, each station in communication with an EO switch, comprising:

inserting a programmable network edge switching device between a switching circuit and a transit network;

distributing logic configured to provide select features to said programmable network edge switch device;

intercepting edge switching events;

applying said logic to the intercepted edge switching events and user information;

generating switching primitives; and using the switching primitives to establish calls on a transit network.

25. The method of claim 24, wherein said distributed logic is generated in a language selected from the group consisting of Java, Java Script, PERL, and Python.

26. The method of claim 24, further comprising:

adding voice-processing circuits configured to provide voice recognition and voice response functionality to select users.

27. The method of claim 24, further comprising:

recording logic configuration changes.

28. The method of claim 27, wherein the step of recording logic configuration changes is performed by a service management point in communication with said edge switching device and a service control point, the service control point configured to store user identification and service selection information.

29. The method of claim 27, wherein the step of distributing logic is triggered by a polling algorithm, the polling algorithm configured to generate a message from the edge switch device to the service management point, said message configured to trigger the service management point to generate and transmit a response.

30. The method of claim 29, wherein the message contains configuration journal information as stored at the edge switch device.

31. The method of claim 29, wherein the response contains configuration journal information as stored at the service management point.

32. The method of claim 29, wherein the polling algorithm is continually repeated.

33. The method of claim 32, wherein the logic is modified in response to a difference in configuration journal numbers.

34. A computer readable medium having a program for enabling calling features, said program comprising:

means for receiving customer data;

means for intercepting edge switching events;

means responsive to said customer data for evaluating calling features to apply to a particular calling station;

means responsive to said intercepted edge switching events and said evaluated calling features for generating switching primitives; and means for using said switching primitives to establish calls between local loop equipment and a transit network.

35. The computer readable medium of claim 34, further comprising:

means for distributing logic from a service management point to at least one edge switch device.

36. The computer readable medium of claim 35, wherein the means for distributing logic is triggered by a polling algorithm, the polling algorithm configured to generate a message from the edge switch device to the service management point, said message configured to trigger the service management point to generate and transmit a response.

37. The computer readable medium of claim 36, wherein the message contains configuration journal information.

38. The computer readable medium of claim 37, wherein the logic stored within a particular edge switch device is updated in response to a difference in configuration journal information stored within the particular edge switch device and the service management point.

* * * * *